US012749498B2

(12) United States Patent
Diener

(10) Patent No.: US 12,749,498 B2
(45) Date of Patent: Sep. 29, 2026

(54) QUALITY ESTIMATION MODEL FOR PACKET LOSS CONCEALMENT

(71) Applicant: Microsoft Technology Licensing, LLC, Redmond, WA (US)

(72) Inventor: Carl Lorenz Diener, Tallinn (ES)

(73) Assignee: Microsoft Technology Licensing, LLC, Redmond, WA (US)

( * ) Notice: Subject to any disclaimer, the term of this patent is extended or adjusted under 35 U.S.C. 154(b) by 384 days.

(21) Appl. No.: 18/079,342

(22) Filed: Dec. 12, 2022

(65) Prior Publication Data

US 2024/0127848 A1 Apr. 18, 2024

Related U.S. Application Data

(60) Provisional application No. 63/415,501, filed on Oct. 12, 2022.

(51) Int. Cl.

| | |
|---|---|
| ***G10L 25/60*** | (2013.01) |
| ***G10L 19/005*** | (2013.01) |
| ***G10L 25/30*** | (2013.01) |
| ***G10L 25/69*** | (2013.01) |

(52) U.S. Cl.
CPC ............ *G10L 25/60* (2013.01); *G10L 19/005* (2013.01); *G10L 25/30* (2013.01); *G10L 25/69* (2013.01)

(58) Field of Classification Search
CPC ....... G10L 25/60; G10L 19/005; G10L 25/30; G10L 25/69
See application file for complete search history.

(56) References Cited

U.S. PATENT DOCUMENTS 9,210,419 B2 * 12/2015 Barrett ............. H04N 21/44209
2002/0131604 A1 9/2002 Amine
2008/0153441 A1 6/2008 Gibbs
2014/0358526 A1 * 12/2014 Abdelal .................. H04L 65/80 704/202
2015/0006164 A1 1/2015 Lu
2019/0051310 A1 * 2/2019 Chang ...................... G10L 25/30
(Continued)

FOREIGN PATENT DOCUMENTS

CN 111327946 A 6/2020

OTHER PUBLICATIONS

Diener, Lorenz, et al. "Interspeech 2022 audio deep packet loss concealment challenge." arXiv preprint arXiv:2204.05222 (2022). (Year: 2022).*
(Continued)

*Primary Examiner* — Bhavesh M Mehta
*Assistant Examiner* — Nandini Subramani
(74) *Attorney, Agent, or Firm* — Schwegman Lundberg & Woessner, P.A.

(57) ABSTRACT

This document relates to training and employing a quality estimation model. One example includes a method or technique that can be performed on a computing device. The method or technique can include providing degraded audio signals to one or more packet loss concealment models, and obtaining enhanced audio signals output by the one or more packet loss concealment models. The method or technique can also include obtaining quality labels for the enhanced audio signals and training a quality estimation model to estimate audio signal quality based at least on the enhanced audio signals and the quality labels.

18 Claims, 13 Drawing Sheets

(56) References Cited

U.S. PATENT DOCUMENTS

| | | | | |
|---|---|---|---|---|
| 2019/0073603 | A1* | 3/2019 | Johansson | H04L 41/149 |
| 2020/0075033 | A1 | 3/2020 | Hijazi et al. | |
| 2021/0343305 | A1* | 11/2021 | Jin | G10L 21/0364 |
| 2022/0067940 | A1 | 3/2022 | Teng et al. | |
| 2022/0076077 | A1* | 3/2022 | Reddy | G06F 18/217 |
| 2022/0101826 | A1* | 3/2022 | Battenberg | G06N 3/044 |
| 2022/0239414 | A1* | 7/2022 | Yang | H04L 1/1607 |
| 2023/0117603 | A1* | 4/2023 | Cutler | G10L 25/30 382/157 |
| 2023/0245674 | A1* | 8/2023 | Serra | G10L 25/30 704/200 |

OTHER PUBLICATIONS

A. Raja,et. al., "Non-Intrusive Quality Evaluation of VoIP Using Genetic Programming," 2006 1st Bio-Inspired Models of Network, Information and Computing Systems, Madonna di Campiglio, Italy, 2006, pp. 1-8 (Year: 2006).*

"Non-Final Office Action Issued in U.S. Appl. No. 17/062,308", Mailed Date: May 11, 2023, 14 Pages.

Notice of Allowance mailed on Jul. 15, 2024, in U.S. Appl. No. 17/502,680, 10 pages.

"Librivox Community Podcast", Retrieved From: https://librivox.org/category/librivox-community-podcast/, May 31, 2020, 9 Pages.

"Methods for Subjective Determination of Transmission Quality", In International Telecommunication Union ~T Recommendation p. 800, Aug. 30, 1996, 37 Pages.

"Optimize and Accelerate Machine Learning Inferencing and Training", Retrieved From: https://onnxruntime.al/, Retrieved on: Jan. 6, 2023, 3 Pages.

"Perceptual Evaluation of Speech Quality (PESQ): An Objective Method for End-to-End Speech Quality Assessment of Narrow-Band Telephone Networks and Speech Codecs", In International Telecommunication Union-T Recommendation, P-862, Feb. 2001, 30 Pages.

"PLC-Challenge/PLCMOS", Retrieved From: https://github.com/microsoft/PLC-Challenge/tree/main/PLCMOS, Mar. 7, 2022, 1 Page.

"Single-ended Method for Objective Speech Quality Assessment in Narrow-band Telephony Applications", In International Telecommunication Union-T Recommendation p. 563, May 14, 2004, 66 Pages.

"Subjective Evaluation of Speech Quality with a Crowdsourcing Approach", Retrieved From: https://www.itu.int/rec/T-REC-P.808-202106-I/en, Jun. 13, 2021, 36 Pages.

Avila, et al., "Non-intrusive Speech Quality Assessment using Neural Networks", In Repository of arXiv:1903.06908v1, Mar. 16, 2019, 5 Pages.

Bahat, et al., "Self-Content-based Audio Inpainting", In Journal of Signal Processing, vol. 111, Jun. 2015, pp. 61-72.

Barrera, Pablo, "Improving Audio Quality in Duo with WaveNetEQ", Retrieved From: https://ai.googleblog.com/2020/04/improving-audio-quality-in-duo-with.html, Apr. 1, 2020, 6 Pages.

Beerends, et al., "Perceptual Objective Listening Quality Assessment, The Third Generation ITU-T Standard for End-to-End Speech Quality Measurement Part II—Perceptual Model", In Journal of the Audio Engineering Society, vol. 61, No. 6, Jun. 2013, pp. 385-402.

Cauchi, et al., "Non-Intrusive Speech Quality Prediction Using Modulation Energies and LSTM-Network", In Journal of IEEE/ACM Transactions on Audio, Speech, and Language Processing, vol. 27, Issue 7, Apr. 18, 2019, pp. 1151-1163.

Defossez, et al., "Real Time Speech Enhancement in the Waveform Domain", In Repository of arXiv:2006.12847v3, Sep. 6, 2020, 5 Pages.

Diener, et al., "Interspeech 2022 Audio Deep Packet Loss Concealment Challenge", In repository of arXiv:2204.05222v1, Apr. 11, 2022, 5 Pages.

Diener, Lorenz, "PLC-Challenge", Retrieved From: https://github.com/microsoft/PLC-Challenge, Oct. 7, 2022, 4 Pages.

Dong, et al., "An Attention enhanced multi-task model for objective speech assessment in real-world environments", In Proceedings of IEEE International Conference on Acoustics, Speech and Signal Processing, May 4, 2020, pp. 911-915.

Gamper, et al., "Intrusive and Nonintrusive Perceptual Speech Quality Assessment using a Convolutional Neural Network", In Proceedings of IEEE Workshop on Applications of Signal Processing to Audio and Acoustics, Oct. 20, 2019, pp. 85-89.

Hasslinger, et al., "The gilbert-elliott model for packet loss in real time services on the internet", In Proceedings of 14th GI/ITG Conference—Measurement, Modelling and Evalutation of Computer and Communication Systems, Mar. 31, 2008, 15 Pages.

Hellwig, et al., "Speech codec for the European mobile radio system", In Proceedings of IEEE Global Telecommunications Conference and Exhibition 'Communications Technology for the 1990s and Beyond', Nov. 27, 1989, pp. 1065-1069.

Hoshen, et al., "Speech Acoustic Modeling from Raw Multichannel Waveforms", In Proceedings of IEEE International Conference on Acoustics, Speech and Signal Processing, Apr. 19, 2015, pp. 4624-4628.

Kalchbrenner, et al., "Efficient Neural Audio Synthesis", In Repository of arXiv:1802.08435v1, Feb. 23, 2018, 10 Pages.

Kegler, et al., "Deep Speech Inpainting of Time-Frequency Masks", In Interspeech 2020, Oct. 25, 2020, pp. 3276-3280.

Kong, et al., "HIFI-GAN: Generative Adversarial Networks for Efficient and High Fidelity Speech Synthesis", In Repository of arXiv:2010.05646v2, Oct. 23, 2020, 14 Pages.

Kubichek, R, "Mel-cepstral distance measure for objective speech quality assessment", In Proceedings of IEEE Pacific Rim Conference on Communications Computers and Signal Processing, May 19, 1993, pp. 125-128.

Lecomte, et al., "Packet-loss concealment technology advances in EVS", In Proceedings of IEEE International Conference on Acoustics, Speech and Signal Processing, Apr. 19, 2015, pp. 5708-5712.

Lin, et al., "A Time-Domain Convolutional Recurrent Network for Packet Loss Concealment", In Proceedings of IEEE International Conference on Acoustics, Speech and Signal Processing, Jun. 6, 2021, pp. 7148-7152.

Lo, et al., "MOSNet: Deep Learning-based Objective Assessment for Voice Conversion", In Proceedings of 20th Annual Conference of the International Speech Communication Association, Sep. 15, 2019, pp. 1541-1545.

Manocha, et al., "A Differentiable Perceptual Audio Metric Learned from Just Noticeable Differences", In Repository of arXiv:2001.04460v2, May 18, 2020, 6 Pages.

Mittag, et al., "NISQA: A Deep CNN-Self-Attention Model for Multidimensional Speech Quality Prediction with Crowdsourced Datasets", In Proceedings of Interspeech 2021, Aug. 30, 2021, pp. 2127-2131.

Mocanu, et al., "No-Reference Video Quality Measurement Added Value of Machine Learning", In Journal of Electronic Imaging, vol. 24, Issue 6, Dec. 24, 2015, 16 Pages.

Mohamed, et al., "ConcealNet: An End-to-end Neural Network for Packet Loss Concealment in Deep Speech Emotion Recognition", In Repository of arXiv:2005.07777v1, May 15, 2020, 5 Pages.

Morrone, et al., "Audio-Visual Speech Inpainting with Deep Learning", In Proceedings of IEEE International Conference on Acoustics, Speech and Signal Processing, Jun. 6, 2021, pp. 6653-6657.

Naderi, et al., "An Open source Implementation of ITU-T Recommendation P.808 with Validation", In INTERSPEECH 2020, Oct. 25, 2020, pp. 2862-2866.

Nair, et al., "Cascaded Time + Time-Frequency Unet for Speech Enhancement: Jointly Addressing Clipping, Codec Distortions, and Gaps", In Proceedings of IEEE International Conference on Acoustics, Speech and Signal Processing, Jun. 6, 2021, pp. 7153-7157.

Panayotov, et al., "Librispeech: an Asr Corpus Based on Public Domain Audio Books", In Proceedings of IEEE International Conference on Acoustics, Speech and Signal Processing, Apr. 19, 2015, pp. 5206-5210.

Pascual, et al., "Adversarial Auto-Encoding for Packet Loss Concealment", In Repository of arXiv:2107.03100v2, Jul. 8, 2021, 5 Pages.

(56) References Cited

OTHER PUBLICATIONS

Pascual, et al., "Time-Domain Speech Enhancement using Generative Adversarial Networks", In Journal of Speech Communication, vol. 114, Nov. 1, 2019, pp. 1-37.
"International Search Report and Written Opinion Issued in PCT Application No. PCT/US21/034679", Mailed Date : Sep. 16, 2021, 10 Pages.
Purin, et al., "Aecmos: A speech quality assessment metric for echo impairment", In Proceedings of IEEE International Conference on Acoustics, Speech and Signal Processing, May 23, 2022, pp. 901-905.
Reddy, et al., "A Scalable Noisy Speech Dataset and Online Subjective Test Framework", In Proceedings of 20th Annual Conference of the International Speech Communication Association, Sep. 15, 2019, 5 Pages.
Reddy, et al., "DNSMOS P.835: A Non-Intrusive Perceptual Objective Speech Quality Metric to Evaluate Noise Suppressors", In Proceedings of IEEE International Conference on Acoustics, Speech and Signal Processing, May 23, 2022, 4 p.
Reddy, et al., "DNSMOS: A Non-Intrusive Perceptual Objective Speech Quality metric to evaluate Noise Suppressors", In Repository of arXiv:2010.15258v2, Feb. 10, 2021, 5 Pages.
Reddy, et al., "INTERSPEECH 2021 Deep Noise Suppression Challenge", In Proceedings of Interspeech 2021, Apr. 30, 2021, pp. 2796-2800.
Reddy, et al., "Supervised Classifiers for Audio Impairments with Noisy Labels", In Proceedings of 20th Annual Conference of the International Speech Communication Association, Sep. 15, 2019, 5 Pages,.
Reddy, et al., "The Interspeech 2020 Deep Noise Suppression Challenge: Datasets, Subjective Testing Framework, and Challenge Results", In Journal of Computing Research Repository, May 16, 2020, 5 Pages.
Rix, et al., "Perceptual Evaluation of Speech Quality (PESQ)-A New Method for Speech Quality Assessment of Telephone Networks and Codecs", In Proceedings of IEEE International Conference on Acoustics, Speech, and Signal Processing, May 7, 2001, pp. 749-752.
Rodbro, et al., "Hidden Markov model-based Packet Loss Concealment for Voice Over IP", In Journal of IEEE Transactions on Audio, Speech, and Language Processing, vol. 14, Issue 5, Sep. 2006, pp. 1609-1623.
Rolnick, et al., "Deep Learning is Robust to Massive Label Noise", In Repository of arXiv:1705.10694v2, May 31, 2017, pp. 1-10.
Ronneberger, et al., "U-Net: Convolutional Networks for Biomedical Image Segmentation", In Repository of arXiv:1505.04597v1, May 18, 2015, 8 Pages.
Serrà, et al., "SESQA: Semi-Supervised Learning for Speech Quality Assessment", In Repository of arXiv:2010.00368v2, Feb. 8, 2021, 14 Pages.
"Final Office Action Issued in U.S. Appl. No. 17/062,308", Mailed Date: Aug. 18, 2023, 17 Pages.
Non-Final Office Action mailed on Jan. 9, 2024, in U.S. Appl. No. 17/062,308, 18 pages.
Diener, et al., "PLCMOSV2—A data-driven non-intrusive metric for the evaluation of deep learning packet loss concealment algorithms," Microsoft Corporation, 2023, 05 Pages.
Non-Final Office Action mailed on Dec. 22, 2023, in U.S. Appl. No. 17/502,680, 24 pages.
Zhou, et al., "Vision-Infused Deep Audio Inpainting", In Proceedings of IEEE/CVF International Conference on Computer Vision, Oct. 27, 2019, pp. 283-292.
Shi, et al., "Speech Loss Compensation by Generative Adversarial Networks", In Proceedings of Asia-Pacific Signal and Information Processing Association Annual Summit and Conference, Nov. 18, 2019, pp. 347-351.
Sun, et al., "Impact of Packet Loss Location on Perceived Speech Quality", In 2nd IP-Telephony workshop, Apr. 6, 2001, 9 Pages.
Taal, et al., "An Algorithm for Intelligibility Prediction of Time-Frequency Weighted Noisy Speech", In Proceedings of IEEE Transactions on Audio, Speech, and Language Processing, vol. 19, No. 7, Feb. 14, 2011, pp. 2125-2136.
Tanaka, et al., "WaveCycleGAN2: Time-domain Neural Post-filter for Speech Waveform Generation", In Repository of arXiv:1904.02892v2, Apr. 9, 2019, 5 Pages.
Thakker, et al., "Fast Real-time Personalized Speech Enhancement: End-to-End Enhancement Network (E3Net) and Knowledge Distillation", In Proceedings of Interspeech 2022, Sep. 18, 2022, pp. 991-995.
Thirunavukkarasu, et al., "A survey on VoIP packet loss techniques", In International Journal of Communication Networks and Distributed Systems, vol. 14, Issue 1, Jan. 1, 2015, pp. 106-116.
Wang, et al., "A temporal-spectral generative adversarial network based end-to-end packet loss concealment for wideband speech transmission", In The Journal of the Acoustical Society of America, vol. 150, No. 4, Oct. 11, 2021, pp. 2577-2588.
Xia, et al., "Weighted Speech Distortion Losses for Neural-Network-Based Real-Time Speech Enhancement", In Proceedings of IEEE International Conference on Acoustics, Speech and Signal Processing, May 4, 2020, pp. 871-875.
Yu, et al., "The accuracy of gilbert models in predicting packetloss statistics for a single-multiplexer network model", In Proceedings IEEE 24th Annual Joint Conference of the IEEE Computer and Communications Societies, Mar. 13, 2005, pp. 2602-2612.
"Adaptive Multi-Rate (AMR) speech codec; Error concealment of lost frames", Retrieved From: https://web.archive.org/web/20221209164743/https://portal.3gpp.org/desktopmodules/Specifications/SpecificationDetails.aspx?specificationid=1425, Dec. 9, 2022, 1 Page.

* cited by examiner

QUALITY ESTIMATION MODEL FOR PACKET LOSS CONCEALMENT

BACKGROUND

Machine learning can be used to perform a broad range of tasks, such as natural language processing, financial analysis, and image processing. Machine learning models can be trained using several approaches, such as supervised learning, semi-supervised learning, unsupervised learning, reinforcement learning, etc. In approaches such as supervised or semi-supervised learning, labeled training examples can be used to train a model to map inputs to outputs. In unsupervised learning, models can learn from patterns present in an unlabeled dataset.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for training and employing a quality estimation model. One example includes a method or technique that can be performed on a computing device. The method or technique can include providing degraded audio signals to one or more packet loss concealment models and obtaining enhanced audio signals output by the one or more packet loss concealment models. The method or technique can also include obtaining quality labels for the enhanced audio signals and training a quality estimation model to estimate audio signal quality based at least on the enhanced audio signals and the quality labels.

Another example includes a system having a hardware processing unit and a storage resource storing computer-readable instructions. When executed by the hardware processing unit, the computer-readable instructions can cause the system to obtain enhanced audio signals that have been enhanced by a particular packet loss concealment model. The computer-readable instructions can also cause the system to provide the enhanced audio signals to a quality estimation model configured to estimate synthetic quality labels for the enhanced audio signals. The quality estimation model can have been trained using other enhanced audio signals output by one or more other packet loss concealment models. The computer-readable instructions can also cause the system to output the synthetic quality labels.

Another example includes a computer-readable storage medium. The computer-readable storage medium can store instructions which, when executed by a computing device, cause the computing device to perform acts. The acts can include providing degraded audio signals to one or more enhancement models and obtaining enhanced audio signals output by the one or more enhancement models. The acts can also include obtaining quality labels for the enhanced audio signals and identifiers associated with the quality labels. The acts can also include training a quality estimation model to estimate audio signal quality based at least on the enhanced audio signals, the identifiers, and the quality labels.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
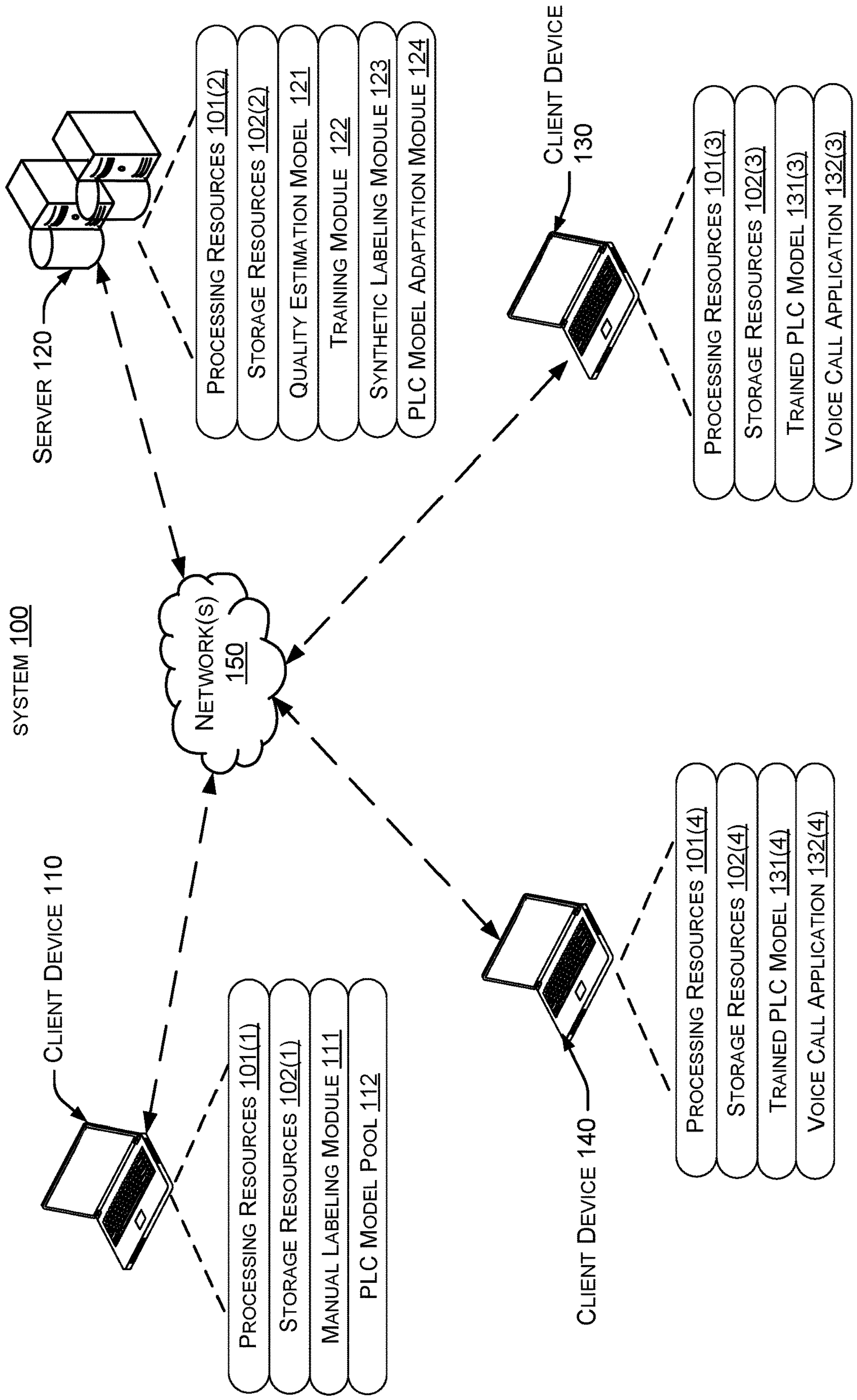
FIG. 1 illustrates an example system, consistent with some implementations of the present concepts.

For many signal processing applications, it is useful to have an objective metric that characterizes the quality of a given signal. For instance, consider a degraded audio signal that has been subjected to some packet loss before being played back by a computing device that receives the audio signal over a network. Here, packet loss means either a packet that is not received at all, or that is received too late to be played back (e.g., given the size of the jitter buffer). A human being can listen to the degraded audio signal and manually rate the audio quality of the signal. If the degraded audio signal has been enhanced by a packet loss concealment ("PLC") model to restore missing parts of the signal, the manual rating provides an indication of how well the PLC model performed at restoring the missing parts of the signal.

Given enough manual ratings of different audio files, it is possible to train or test a machine learning model that performs packet loss concealment. However, manual labeling of audio files is very expensive and time-consuming. The disclosed implementations provide techniques for training and employing quality estimation models that perform automated estimation of the audio quality of signals that have been restored by a PLC model. Once trained, such quality estimation models can provide synthetic quality labels for audio files at far less expense than manual techniques.

Quality estimation models such as those disclosed herein can be employed for a wide range of applications. For instance, a quality estimation model can be employed to rank a variety of different PLC models, or to select a single PLC model from a group of available models. A quality estimation model can also be employed to detect or repair problems at runtime for a given audio application, e.g., by adjusting the size of a jitter buffer when degraded audio quality is detected. A quality estimation model can also be employed to train or test a PLC model based on synthetic quality labels produced by the quality estimation model.

Definitions

For the purposes of this document, the term "signal" refers to a function that varies over time or space. A signal can be represented digitally using data samples, such as audio samples, video samples, or one or more pixels of an image. A "degraded signal" is a signal that has impairments that are not present in another (e.g., original) version of the signal. An "enhancement model" refers to a model that processes data samples from an input signal to enhance the perceived quality of the signal, e.g., by removing or reducing impairments. For instance, the enhancement model could remove noise or echoes from audio data, or could sharpen image or video data. One type of enhancement model is a "packet loss concealment model," which enhances audio signals degraded by lost or late packets by restoring parts of the signal. Packet loss concealment models can be implemented using classical coding algorithms as well as machine learning models. An "enhanced signal" is any signal that has been processed by a data enhancement model, irrespective of whether that signal would be perceived as being enhanced by a human user relative to the original signal.

The term "quality estimation model" refers to a model that evaluates an input signal to estimate how a human might rate the perceived quality of the signal. For example, a quality estimation model could estimate the quality of an unprocessed or raw audio signal, and output a synthetic label characterizing the quality of the signal with respect to impairments such as device distortion, background noise, room reverberation, packet loss artifacts, etc. A quality estimation model could also evaluate an enhanced audio signal that has been enhanced by a particular enhancement model, and the quality estimation model could output a synthetic label reflecting how effective the particular enhancement model was at enhancing the signal as well as the extent to which the particular enhancement model may have introduced undesirable artifacts when removing the noise. Here, the term "synthetic label" means a label at least partially generated by a machine, where a "manual" label is provided by a human being.

The term "model" is used generally herein to refer to a range of processing techniques, and includes models trained using machine learning as well as hand-coded (e.g., heuristic-based) models. For instance, a machine-learning model could be a neural network, a support vector machine, a decision tree, etc. Whether machine-trained or not, enhancement models can include codecs or other compression mechanisms, audio noise suppressors, echo removers, distortion removers, PLC models, image/video healers, low light enhancers, image/video sharpeners, image/video denoisers, etc., as discussed more below.

The term "impairment," as used herein, refers to any characteristic of a signal that reduces the perceived quality of that signal. Thus, for instance, an impairment can include noise or echoes that occur when recording an audio signal, missing portions of an audio signal due to packet loss, blur or low-light conditions for images or video, etc. One type of impairment is an artifact, which can be introduced by the enhancement model when removing impairments from a raw data sample. Viewed from one perspective, an artifact can be an impairment that is introduced by processing an input signal to remove other impairments. Another type of impairment is a recording device impairment introduced into a raw input signal by a recording device such a microphone or camera. Another type of impairment is a capture condition impairment introduced by conditions under which a raw input signal is captured, e.g., room reverberation for audio, low light conditions for image/video, etc.

Machine Learning Overview

There are various types of machine learning frameworks that can be trained to perform a given task, such as estimating the quality of a signal or enhancing a signal. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. The term "internal parameters" is used herein to refer to learnable values such as edge weights and bias values that can be learned by training a machine learning model, such as a neural network. The term "hyperparameters" is used herein to refer to characteristics of models or model training, such as learning rate, batch size, number of training epochs, number of hidden layers, activation functions, etc.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with internal parameters for the model structure that have been trained or tuned. Note that two trained models can share the same model structure and yet have different values for the internal parameters, e.g., if the two models are trained on different training data or if there are underlying stochastic processes in the training process.

Example System

The present implementations can be performed in various scenarios on various devices. FIG. 1 shows an example system 100 in which the present implementations can be employed, as discussed more below.

As shown in FIG. 1, system 100 includes a client device 110, a server 120, a client device 130, and a client device 140, connected by one or more network(s) 150. Note that the client devices can be embodied both as mobile devices such as smart phones or tablets, as well as stationary devices such as desktops, server devices, etc. Likewise, the servers can be implemented using various types of computing devices. In some cases, any of the devices shown in FIG. 1, but particularly the servers, can be implemented in data centers, server farms, etc.

Certain components of the devices shown in FIG. 1 may be referred to herein by parenthetical reference numbers. For the purposes of the following description, the parenthetical (1) indicates an occurrence of a given component on client device 110, (2) indicates an occurrence of a given component on server 120, (3) indicates an occurrence on client device 130, and (4) indicates an occurrence on client device 140. Unless identifying a specific instance of a given component, this document will refer generally to the components without the parenthetical.

Generally, the devices 110, 120, 130, and/or 140 may have respective processing resources 101 and storage resources 102, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Client device 110 can include a manual labeling module 111 that can assist a human user in labeling audio signals with manual quality labels. In some cases, the human users evaluate audio signals output by using existing PLC models from a PLC model pool 112 to enhance degraded audio signals. As discussed more below, one way to generate degraded audio signals is to subject clean audio signals to packet loss. Thus, the manual quality labels provided by the user can generally characterize how effective the respective PLC models of the PLC model pool can enhance the degraded input signals by restoring missing parts of the degraded audio signals that were lost due to packet loss. In other cases, the manual quality labels can characterize the quality of unprocessed (e.g., raw or unenhanced) signals.

Quality estimation model 121 on server 120 can evaluate the quality of enhanced audio signals. The quality estimation model can be trained using training module 122 using the manual quality labels and the enhanced audio signals. For instance, the quality estimation model can evaluate the enhanced audio signals and output synthetic quality labels that convey the relative quality of the training signals, as estimated by the quality estimation model. The training module can modify internal parameters of the quality estimation model based on the difference between the manual quality labels provided by the human users and the synthetic quality labels output by the quality estimation model. For instance, in neural network implementations, a loss function can be defined to calculate a loss value that is propagated through one or more layers of the quality estimation model. The loss function can be proportional to the difference between the synthetic quality labels output by the quality estimation model and the manual quality labels.

Once the quality estimation model 121 is trained, synthetic labeling module 123 can label audio signals with synthetic labels using the trained quality estimation model. For instance, a training corpus can be generated by processing a large number of unlabeled input signals using the quality estimation model. In other cases, the synthetic labeling module can be used to label input signals for other purposes, such as real-time feedback on the audio or video quality of a call.

PLC model adaptation module 124 can use the synthetic labels provided by synthetic labeling module 123 to train or otherwise modify a PLC model to obtain a trained PLC model. For neural network-based PLC models, the enhancement model adaptation module can adjust internal model parameters such as weights or bias values, or can adjust hyperparameters, such as learning rates, the number of hidden nodes/layers, momentum values, batch sizes, number of training epochs/iterations, etc. The PLC model adaptation module can also modify the architecture of such a model, e.g., by adding or removing individual layers, densely vs. sparsely connecting individual layers, adding or removing skip connections across layers, etc.

After training, the PLC model can be deployed on client device 130 as trained PLC model 131(3) and on client device 140 as trained PLC model 131(4). The trained PLC model can be employed with voice call application 132(3) on client device 130 and voice call application 132(4) on client device 140 to enhance audio signals subject to packet loss over network(s) 150.

Example Method

Figure 2:
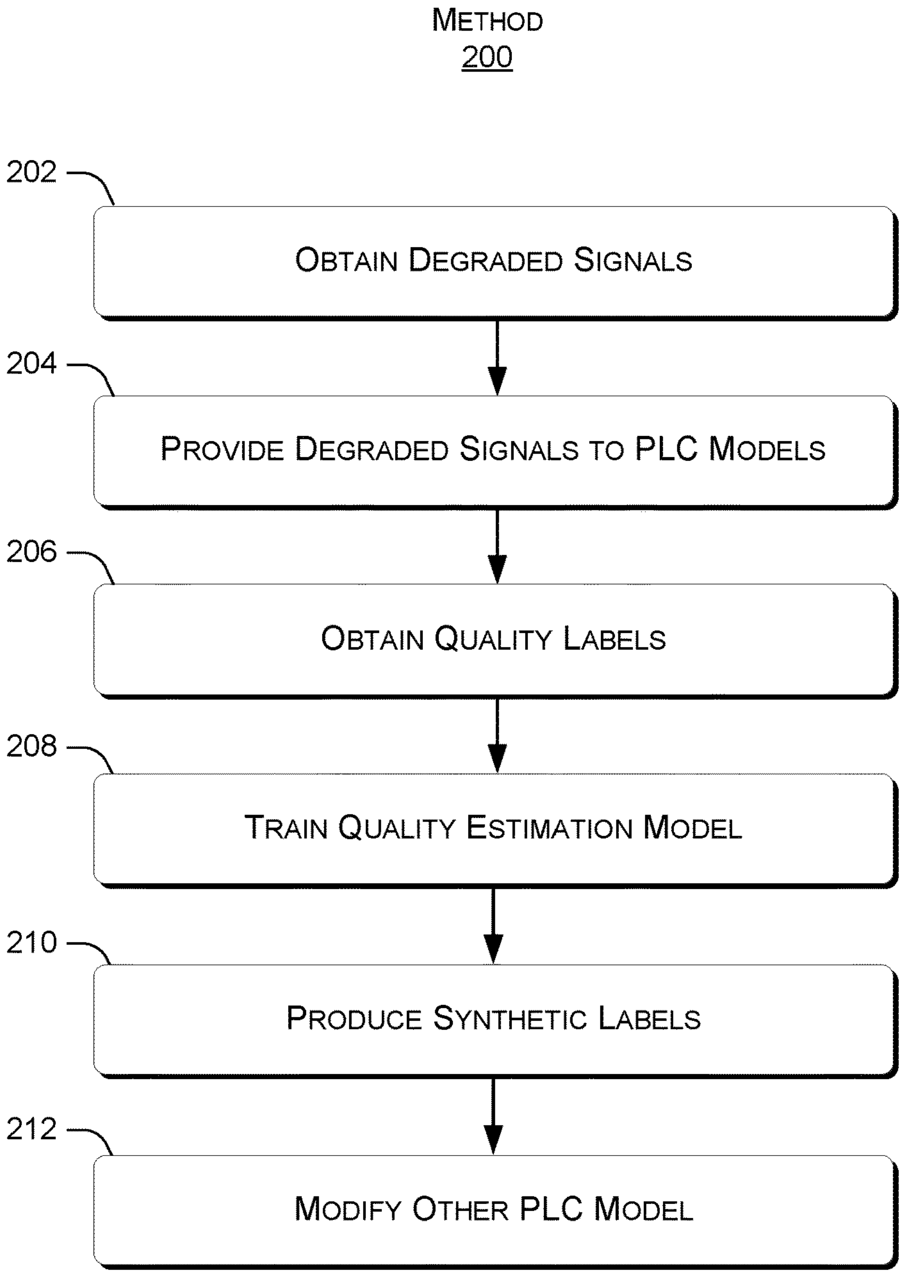
FIG. 2 illustrates an example method or technique for training and employing a quality estimation model, consistent with some implementations of the present concepts.

FIG. 2 illustrates an example method 200, consistent with the present concepts. Method 200 can be implemented on many different types of devices, e.g., by one or more cloud servers, by a client device such as a laptop, tablet, or smartphone, or by combinations of one or more servers, client devices, etc.

Method 200 begins at block 202, where degraded audio signals are obtained. For instance, in some cases, the degraded audio signals can include real audio signals subjected to packet loss during a voice call. In other cases, degraded audio signals can be obtained by modifying clean audio signals using packet traces obtained from voice calls, as discussed more below.

Method 200 continues at block 204, where the degraded audio signals are provided to one or more existing PLC models from a PLC model pool. For instance, the PLC models can be existing classical or machine-learning based PLC models that are available from various sources. Examples of PLC models that can be employed are discussed more below.

Method 200 continues at block 206, where quality labels are obtained for enhanced audio signals produced by the PLC models. For instance, the quality labels can be provided via manual evaluation of the enhanced audio signals, e.g., using an absolute category rating approach.

Method 200 continues at block 208, where a quality estimation model is trained using the enhanced audio signals and the quality labels. The quality estimation model can be adapted to estimate audio signal quality of other audio signals. For example, as described more below, the quality estimation model can be a deep neural network with a convolutional encoder, a gated recurrent unit, one or more first fully-connected layers, and one or more second fully-connected layers.

Method 200 continues at block 210, where synthetic labels are produced for other enhanced audio signals produced by another PLC model, e.g., a new PLC model that was not part of the PLC model pool used to train the quality estimation model. For instance, the quality estimation model can provide the synthetic labels. As used herein, the term "synthetic" means at least partly machine-generated.

Method 200 continues at block 212, where the other PLC model is modified. For instance, the synthetic labels can be used to modify the learned parameters, hyperparameters, and/or an architecture of the other PLC model based on the synthetic labels.

Blocks 202, 204, 206, and 208 of method 200 can be performed by training module 122. Block 210 of method 200 can be performed by synthetic labeling module 123. Block 212 of method 200 can be performed by PLC model adaptation module 124.

In some cases, the human labels and/or synthetic labels rate the quality of a given enhanced audio signal with reference to the original (e.g., raw) audio signal from which that enhanced audio signal was derived. In this case, the human and/or synthetic labels reflect the extent to which the PLC model improved the quality of the audio signal. In other cases, the human and/or synthetic labels evaluate the enhanced audio signal without considering the original audio signal from which they were derived. In addition, a quality estimation model can be trained with or without access to unimpaired reference samples.

Example Quality Estimation Model

Figure 3:
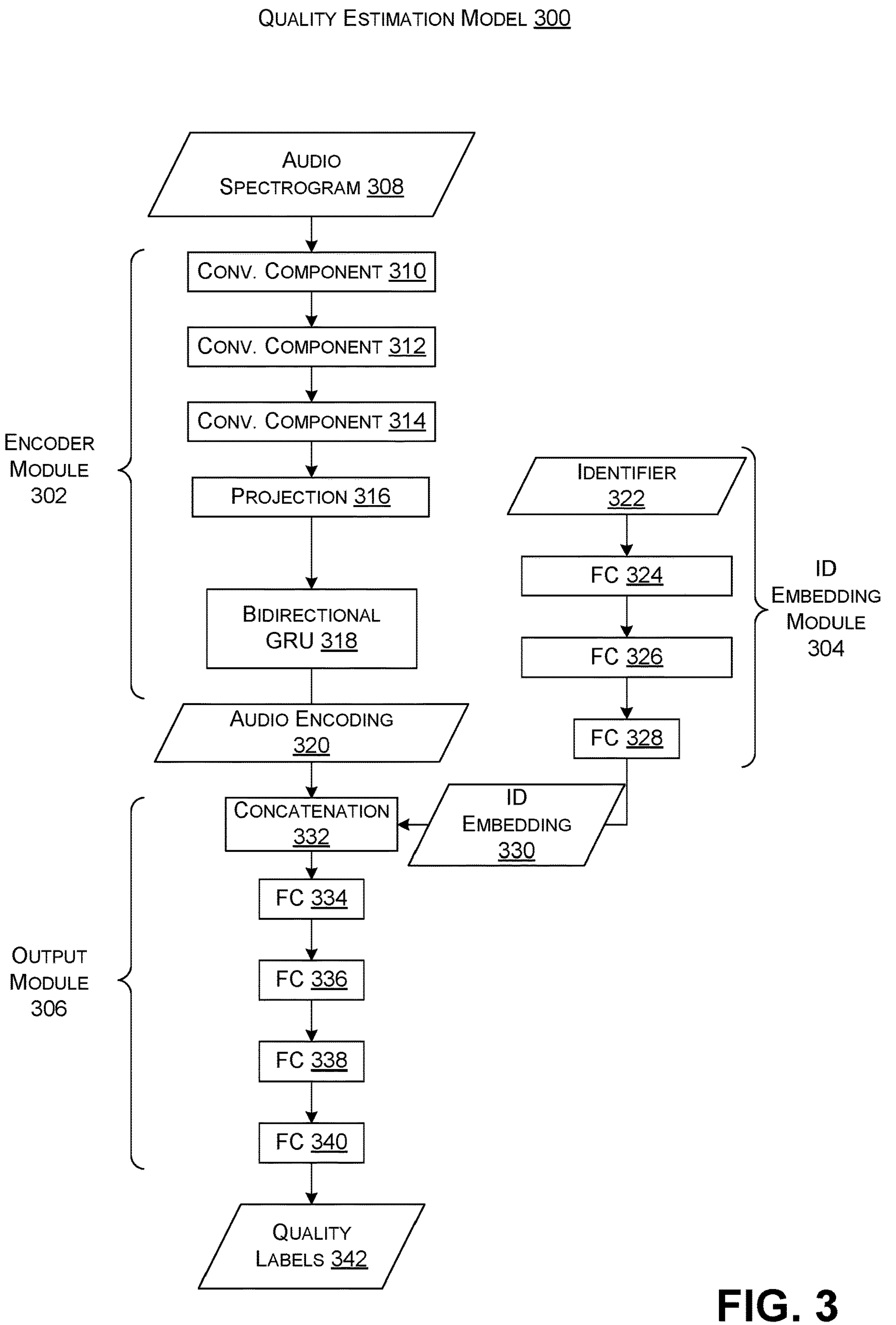
FIG. 3 illustrates an example quality estimation model, consistent with some implementations of the disclosed techniques.

FIG. 3 illustrates a quality estimation model 300 that can be employed to estimate the quality of audio signals enhanced by a PLC model. The model includes an encoder module 302, an ID embedding module 304, and an output module 306. Generally speaking, the encoder module can encode the audio signal into a reduced-dimensionality representation. The ID embedding module can generate an embedding representing a particular rater (e.g., person) that rated a given enhanced audio signal, or an embedding representing a specific quality label or "vote" provided by a particular rater. The output module can generate synthetic quality labels that characterize audio quality of the audio signals.

The encoder module 302 receives an audio spectrogram 308 which is transformed using convolutional components 310, 312, and 314 and a projection layer 316 to encode the signal. For instance, the convolutional components can include 2D convolution layers and pooling layers. The resulting encoded signal is processed by a bidirectional gated recurrent unit ("GRU") layer 318 to produce a resulting audio encoding 320.

The ID embedding module receives an identifier 322 of a specific rater or vote and transforms the identifier using three fully-connected ("FC") layers 324, 326, and 328 to produce an ID embedding 330. A concatenation 332 of the audio encoding and the ID embedding is provided to four additional FC layers 334, 336, 338, and 340 of the output module 306 and then mapped into quality labels 342. For instance, the quality labels can represent one or more mean opinion score rating for a given audio signal.

Example Training Data Flow for Quality Estimation Model

Figure 4:
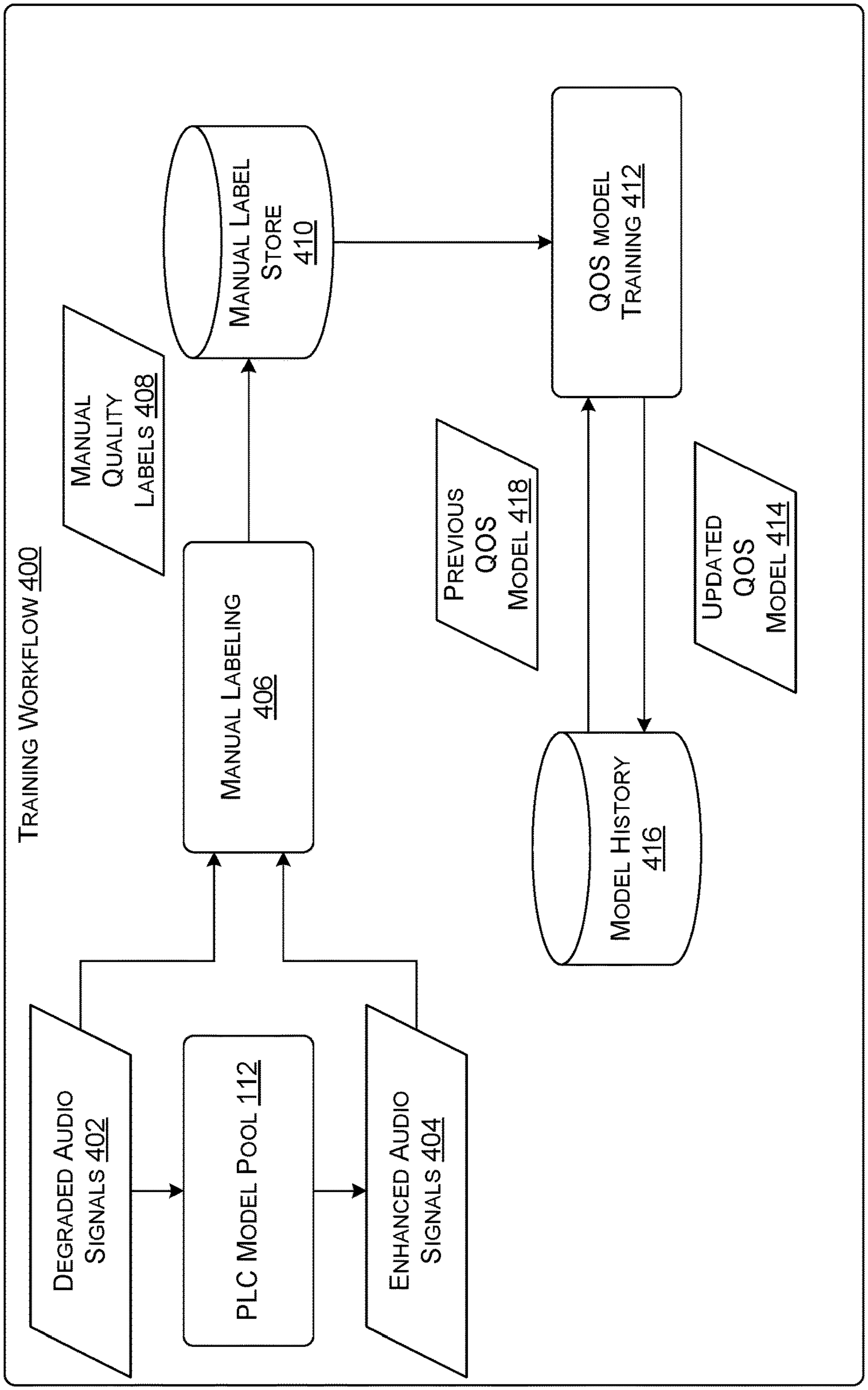
FIG. 4 illustrates an example workflow for training a quality estimation model, consistent with some implementations of the present concepts.

FIG. 4 illustrates an example training workflow 400 for training a quality estimation model, consistent with some implementations of the present concepts.

Degraded audio signals 402 are input to PLC models from PLC model pool 112. The PLC models produce enhanced audio signals 404 by restoring portions of the degraded audio signals missing due to lost or delayed packets. Manual labeling 406 is performed on the degraded audio signals and/or enhanced audio signals (potentially with reference to the degraded audio signals) to obtain manual quality labels 408, which convey the perceived quality of the degraded audio signals or the enhanced audio signals produced by the PLC models in the pool. The manual quality labels are used to populate a manual label store 410.

Quality of service ("QOS") model training 412 proceeds using the manual quality labels 408 in the manual label store 410. Multiple iterations of training can be performed, with internal parameters of the quality of service model being adapted at each iteration to obtain an updated quality of service model 414, which is then output to a model history 416. The next training iteration can proceed by retrieving the previous quality of service model 418 from the model history and continuing with training iterations.

In some cases, quality of service model training 414 is performed until a stopping condition is reached. For instance, stopping conditions can occur when the quality of service model converges, the quality of service model achieves a threshold accuracy on a test data set, a training budget is exhausted, and/or all the examples in the manual label store 410 have been exhausted.

Note that, in some cases, the same degraded audio signals 402 are employed for enhancement by different PLC models in the PLC model pool 112. However, different PLC models can output different enhanced audio signals 404 and the different enhanced audio signals may have different manual quality labels assigned by users.

Example Audio Signals

Figure 5A:
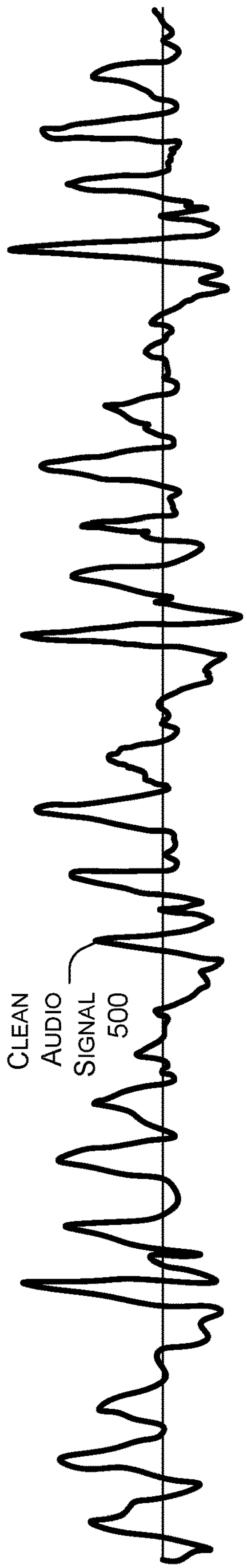
FIG. 5A illustrates an example input audio waveform that can be processed using a packet loss concealment model, consistent with some implementations of the present concepts.

FIG. 5A illustrates a clean audio signal 500, which can be obtained by having a person speak into a microphone under relatively ideal conditions. For instance, clean audio signals can be obtained by having a person read from a transcript into a microphone in a quiet room.

Figure 5B:
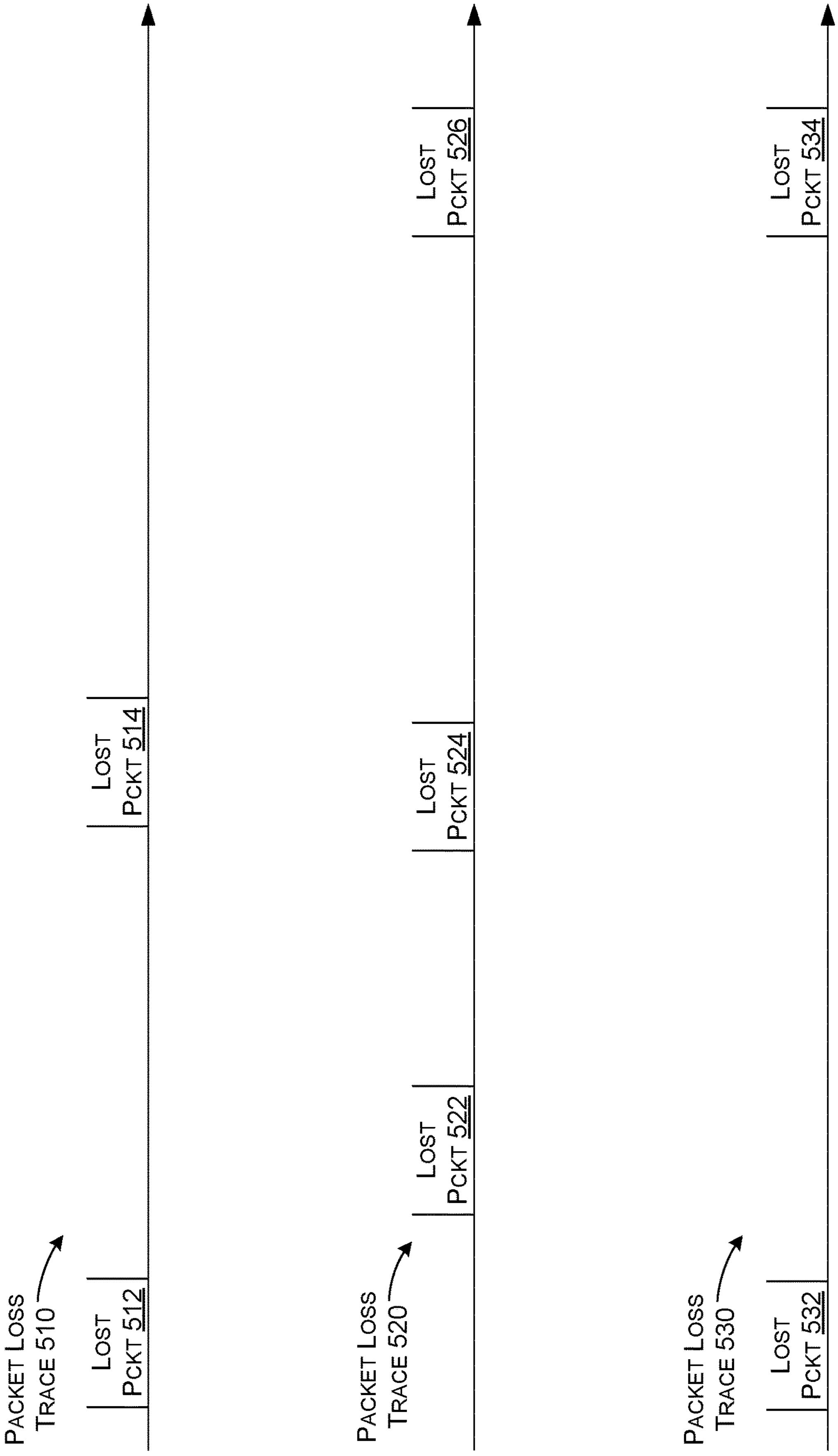
FIG. 5B illustrates three packet loss traces, consistent with some implementations of the present concepts.

FIG. 5B illustrates three packet loss traces 510, 520, and 530. Packet loss trace 510 includes lost packets 512 and 514, packet loss trace 520 includes lost packets 522, 524, and 526, and packet loss trace 530 includes lost packets 532 and 534. Each packet loss trace can be obtained by accessing network logs for real audio calls where audio was streamed over a network. Note that the packet loss traces can involve actual conversations by different users and using different spoken words than those used to obtain the clean audio signals.

Figure 5C:
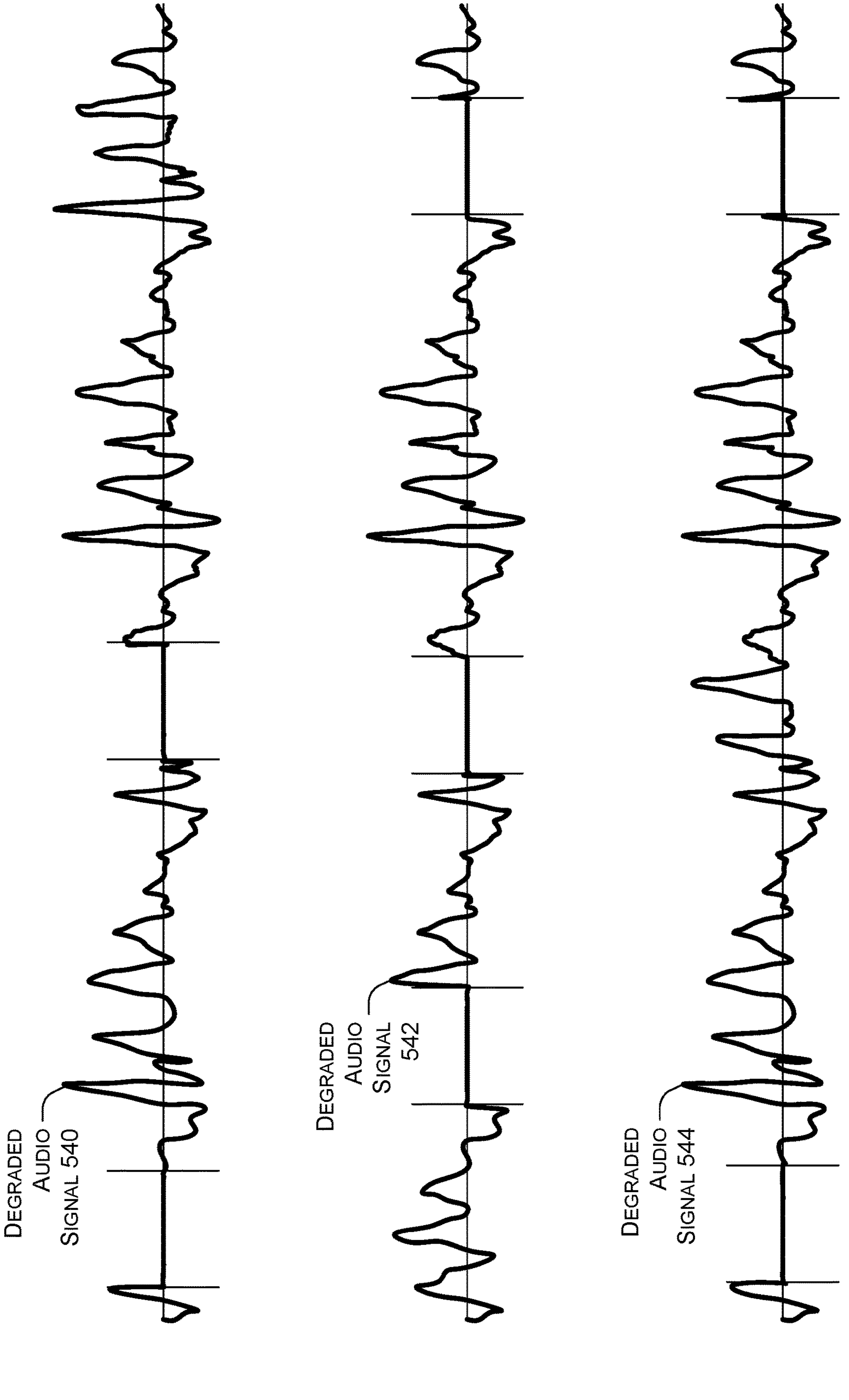
FIG. 5C illustrates three degraded audio waveforms obtained by modifying an input audio waveform using three packet loss traces, consistent with some implementations of the present concepts.

FIG. 5C illustrates degraded audio signals 540, 542, and 544. Degraded audio signal 540 can be obtained by dropping packets from clean audio signal 500 according to packet loss trace 510, e.g., by removing portions of the clean audio signal corresponding to lost packets 512 and 514. Degraded audio signal 542 can be obtained by dropping packets from clean audio signal 500 according to packet loss trace 520, e.g., by removing portions of the clean audio signal corresponding to lost packets 522, 524, and 526. Degraded audio signal 544 can be obtained by dropping packets from clean audio signal 500 according to packet loss trace 530, e.g., by removing portions of the clean audio signal corresponding to lost packets 532 and 534. Thus, each degraded audio signal conveys how clean audio signal 500 would have sounded to a recipient given the network conditions experienced during the real calls when the packet loss traces were recorded.

Figure 5D:
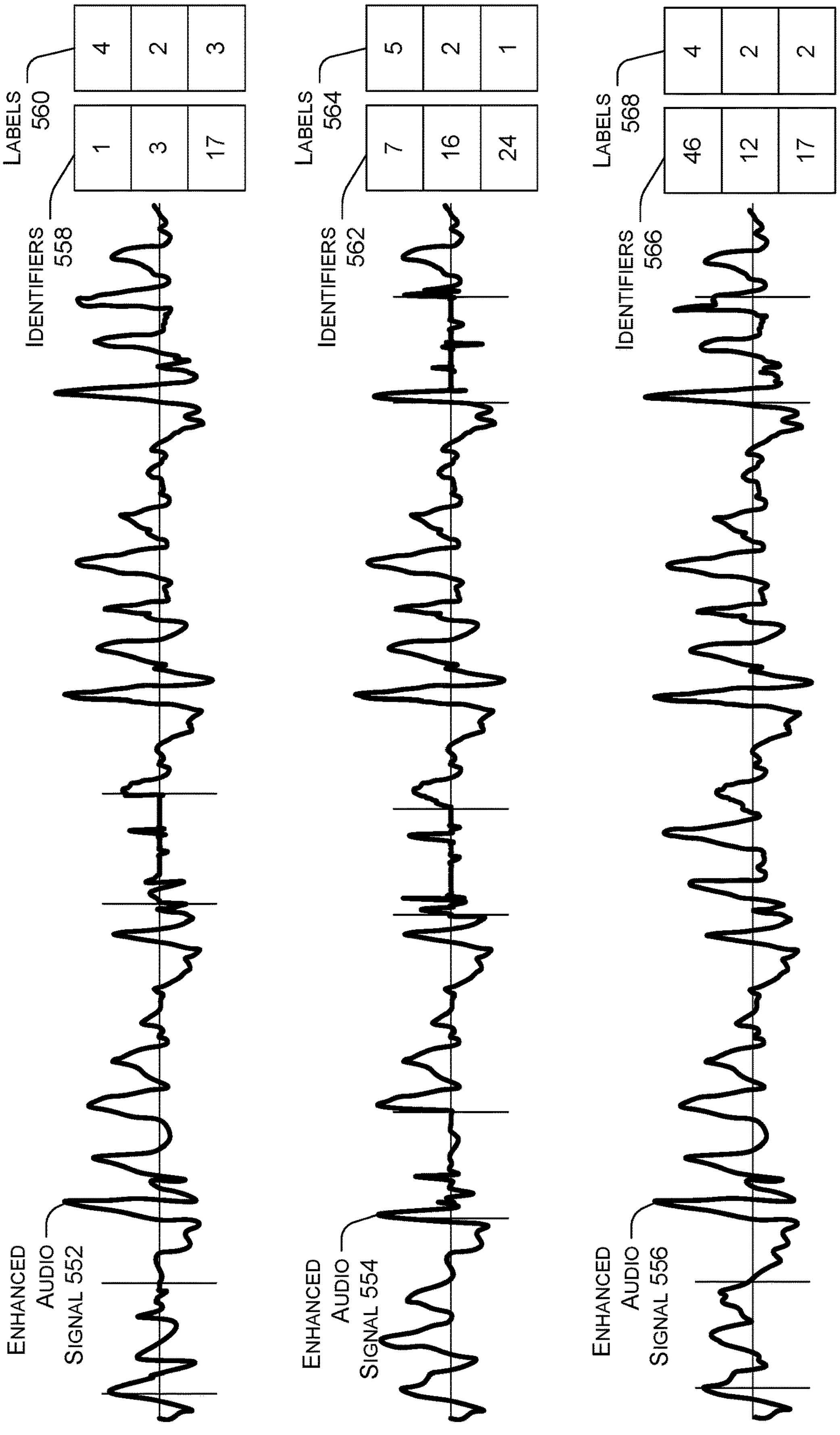
FIGS. 5D and 5E illustrate enhanced audio waveforms obtained by processing degraded audio waveforms using packet loss concealment models, consistent with some implementations of the present concepts.

FIG. 5D illustrates enhanced audio signals 552, 554, and 556. A first PLC model from PLC model pool 112 can produce enhanced audio signal 552 from degraded audio signal 540, enhanced audio signal 554 from degraded audio signal 542, and enhanced audio signal 556 from degraded audio signal 544. Enhanced audio signal 552 can have corresponding identifiers 558 and labels 560, enhanced audio signal 554 can have corresponding identifiers 562 and labels 564, and enhanced audio signal 556 can have corresponding identifiers 566 and labels 568. Each identifier can identify a rater (e.g., a person) that rated the enhanced audio signal for quality. Each label can convey the quality of that audio signal as determined by the rater.

Figure 5E:
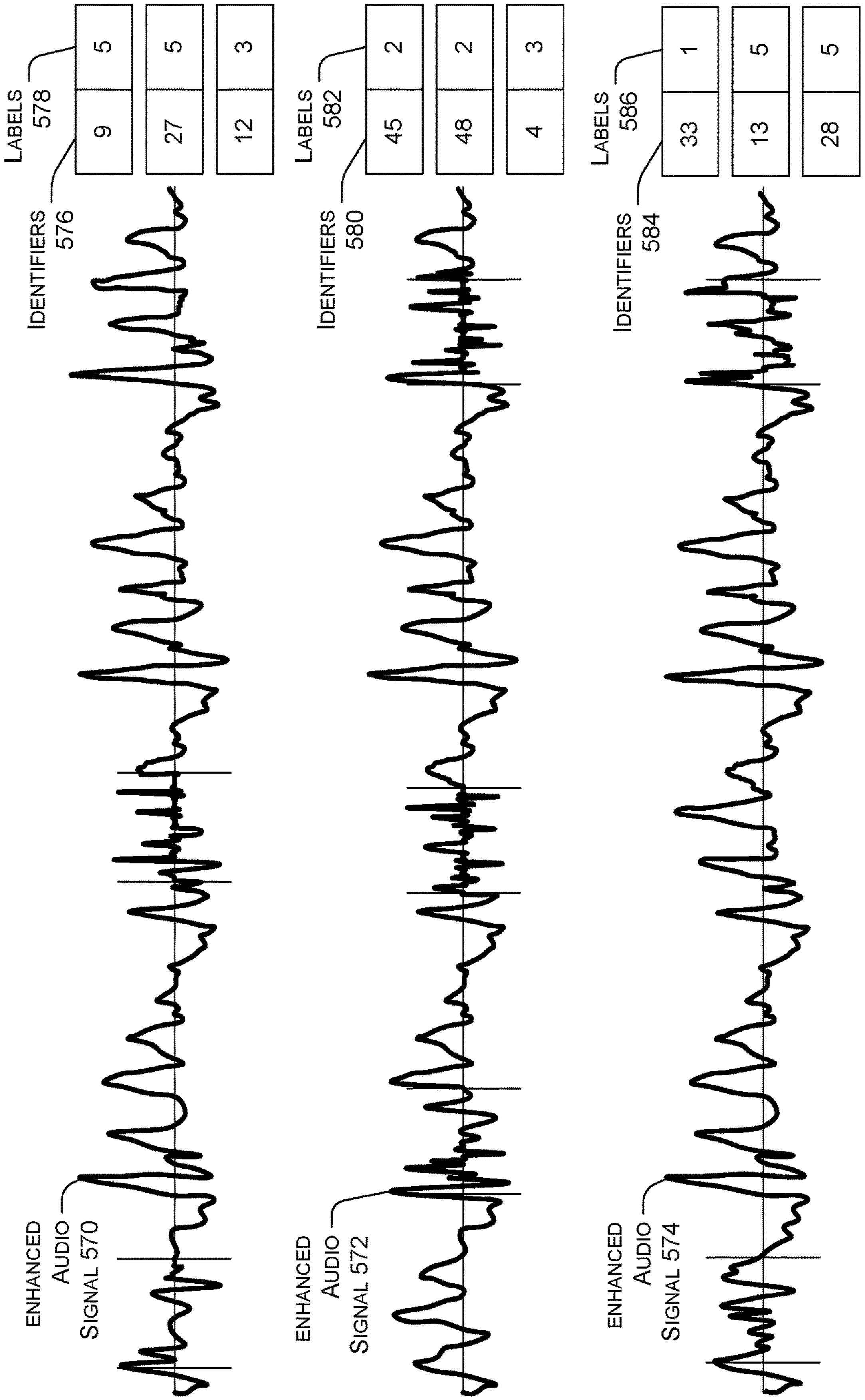

FIG. 5E illustrates enhanced audio signals 570, 572, and 574. A second PLC model from PLC model pool 112 can produce enhanced audio signal 570 from degraded audio signal 540, enhanced audio signal 572 from degraded audio signal 542, and enhanced audio signal 574 from degraded audio signal 544. Enhanced audio signal 570 can have corresponding identifiers 576 and labels 578, enhanced audio signal 572 can have corresponding identifiers 580 and labels 582, and enhanced audio signal 574 can have corresponding identifiers 584 and labels 586. As described above with respect to FIG. 5B, enhanced audio signal 570 can have corresponding identifiers 576 and labels 578, enhanced audio signal 572 can have corresponding identifiers 580 and labels 582, and enhanced audio signal 574 can have corresponding identifiers 584 and labels 586.

Note that FIGS. 5D and 5E illustrate how the same degraded audio signal can be enhanced differently by different PLC models. The differences in the enhanced audio signals shown in FIGS. 5D and 5E are limited to portions of the degraded signals corresponding to lost packets. However, in practice this is not necessarily the case, as PLC models can modify portions of the degraded signal that occur adjacent to lost packets as well as the portions of the signal that are missing due to packet loss.

Collectively, FIGS. 5A-5C illustrate how degraded audio signals 402 can be generated for use in training workflow 400. FIGS. 5D and 5E illustrate how manual quality labels 408 can be obtained for each enhanced audio signal 404.

Example PLC Model Adaptation Workflow

Once a quality estimation model is trained as described above, the quality estimation model can be employed to train new quality estimation models using synthetic labels for training. For instance, referring to FIG. 1, trained PLC models 131(3) and 131(4) can be new PLC models that were not used to train the quality of the service model.

Figure 6:
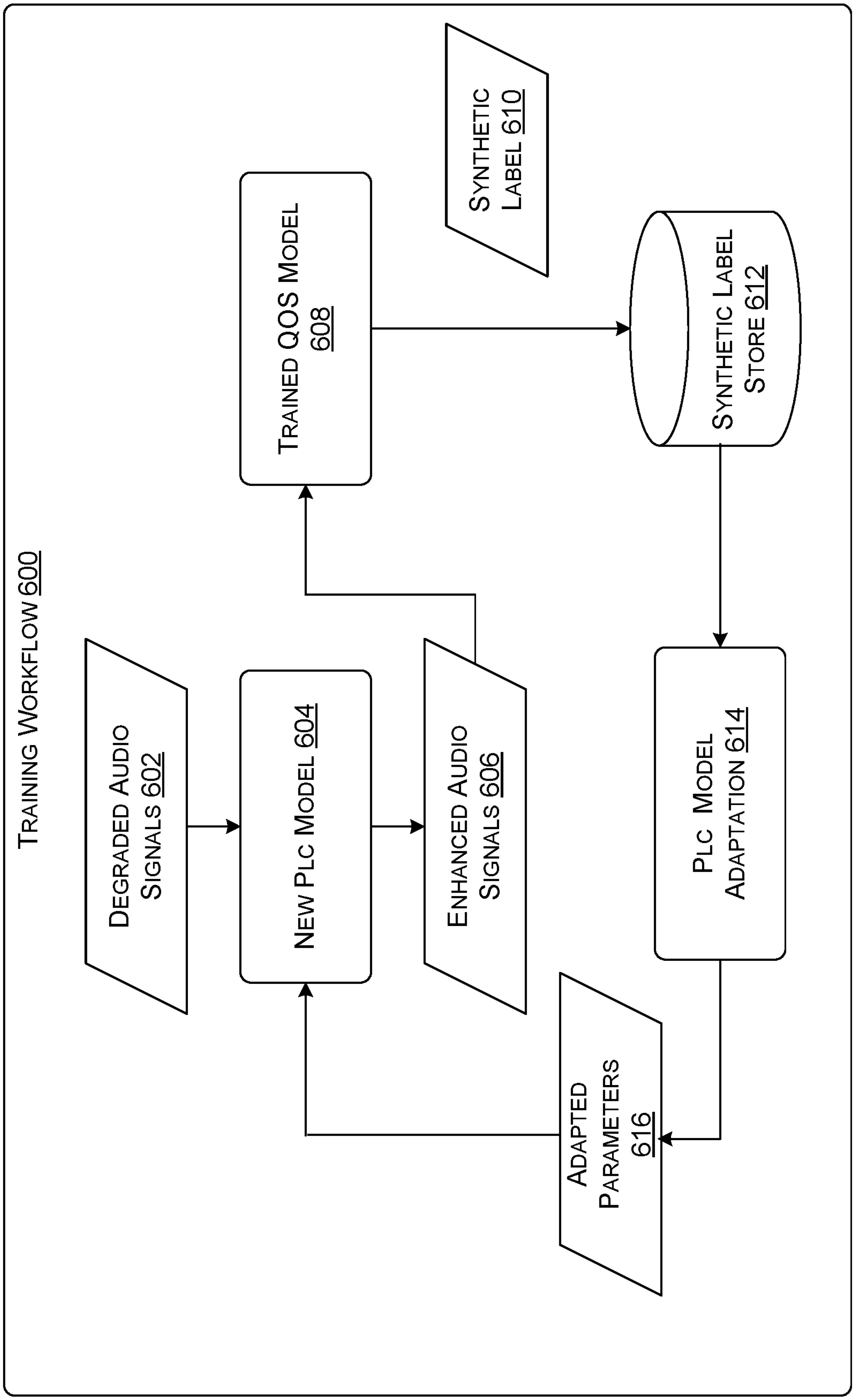
FIG. 6 illustrates an example workflow for modifying an enhancement model, consistent with some implementations of the present concepts.

FIG. 6 illustrates an example training workflow 600 for training a new PLC model, consistent with some implementations of the present concepts. Degraded audio signals 602 are provided to a new PLC model 604, which outputs enhanced audio signals 606. At first, the new PLC model may have initialized parameters that do not tend to improve the audio quality of the enhanced audio signals. As training workflow proceeds as follows, the parameters may be adapted so that the new PLC model becomes better at enhancing audio quality.

The enhanced audio signals 606 are input to a trained quality of service model 608, which produces synthetic labels 610. The synthetic labels are stored in a synthetic label store 612. A PLC model adaptation 614 is performed to obtain adapted parameters 616. The adapted parameters can be employed by new PLC model 604 for the next iteration of model adaptation.

In some cases, PLC model adaptation 614 can involve adjusting internal parameters, such as neural network weights and bias values. In such implementations, a loss function can be defined over the values of the synthetic labels 610, where lower quality values for the synthetic labels imply greater loss values. The calculated loss values can be back-propagated through the PLC model to adjust the internal parameters.

PLC model adaptation can also involve architectural changes. For instance, an initial pool of candidate PLC model structures can be defined, where each candidate PLC model structure has a specified number and type of layers, connectivity, activation functions, etc. Individual candidate PLC model structures can be trained using training workflow 600, and relatively high-performing candidate model structures can be retained for modification, where a "high-performing" candidate PLC model structure implies relatively higher average synthetic quality labels for enhanced audio signals produced using that model structure. Next, these high-performing candidate PLC model structures can be modified, e.g., by adding layers, removing layers, changing the type of individual layers, the number of hidden layers, changing layer connectivity or activation functions, and so on to obtain a new pool of candidate model structures. This process can be repeated several times until a final candidate model is selected and trained using synthetic labels as described above.

Note that PLC model adaptation can also involve selection of hyperparameters such as learning rates, batch sizes, numbers of training epochs, etc. In some cases, the same PLC model structure can be trained with synthetic quality labels using different learning rates and/or batch sizes, resulting in multiple enhancement models sharing structure but having different internal parameters. The PLC model having the best overall average synthetic quality label can be selected as a final enhancement model.

Experiments

The following discussion uses the term "PLCMOS" to refer to a quality estimation model, such as model 300 shown in FIG. 3, that can be trained to evaluate audio signals that have been enhanced using PLC models.

Experiments were conducted using audio data from two datasets: The LibriSpeech dataset (Panayotov, et al., "Librispeech: An ASR corpus based on public domain audio books," 2015 IEEE International Conference on Acoustics, Speech and Signal Processing (ICASSP), South Brisbane, Queensland, Australia, April 2015, pp. 5206-5210) and a LibriVox Podcasts dataset (Librivox Contributors, "The librivox community podcast," https://librivox.org/category/librivox-community-podcast/(archived Oct. 10, 2022), https://web.archive.org/web/20221004121008/). The former is a collection of speech being read from audiobooks, while the latter consists mostly of conversational speech taken from recordings of the LibriVox Podcast, which are in the public domain. For the purposes of this document, both of these are considered clean audio signals, and to generate degraded audio, they were processed by simulating packet loss.

The input to quality estimation model 300 can be obtained by converting audio data to spectrograms using a short-term Fourier transform with a 32 ms Hamming window and a 16 ms frame shift. The logarithm of the power can be applied to generate the input features for the model. For training, different types of augmentation were performed, such as trimming a small number of samples and changing the volume to increase the robustness of the model against changes that a human would not interpret as strongly impacting quality.

Packet Loss Traces

Real network packet traces recorded from Microsoft Teams calls were obtained. These traces record packet metadata such as losses and transmission times (though not the actual audio data) for audio streams during these calls. By combining such a trace with an audio file, a degraded audio file can be produced. The degraded audio file sounds like a call would have sounded given the network traffic disruptions from that packet trace.

Many calls experience only very light packet loss. Sampling equally from real packet loss traces would, therefore, result mostly in very easy cases that are not interesting or useful for the evaluation of PLC algorithms. To cover the spectrum of scenarios that a PLC model should be able to handle, the existing calls were filtered so that high loss and high burst cases were appropriately covered. This resulted in three sets of traces:

Basic: This trace set focuses on providing good coverage of realistic packet loss conditions. The traces were sampled as follows: First, 10-second segments with at least one lost packet were randomly extracted from the base trace set. From these, all segments with a burst loss of more than 120 milliseconds were discarded. The remaining traces were divided into 14 buckets according to packet percentage loss quantiles. Finally, an equal number of traces were sampled from each bucket, for a total of 1400 traces (100 per bucket).

Heavy Loss: This trace set focuses on heavier and longer loss conditions, including losses that could be considered as irrecoverable by a real-time model. First, data was segmented as before. These segments were then divided into three subsets according to maximum burst loss length:

Up to 120 ms

Between 120 and 320 ms

Between 320 and 1000 ms

Segments with burst losses longer than 1000 ms were discarded, as filling multi-second gaps at all is beyond the expected capability of deep PLC models. Each subset was divided the same way as in the basic set. Finally, an equal number of traces were sampled from each bucket (with more traces being sampled per bucket for the subsets with shorter maximum burst losses).

Long Bursts: While the other sets focus on coverage of different rates of packet loss that may be more or less bursty, this trace set focuses specifically on long, but realistic burst losses, with loss rate being secondary. This trace set was obtained by randomly sampling trace segments (obtained as in the previous two cases) that meet the following conditions:

Maximum burst length between 120 and 300 ms

Median burst length of at least 80 ms

Packet loss percentage between 10 and 70 percent

A total of 500 traces were sampled for this dataset.

Packet Loss Concealment Model Pool

To train a quality estimation model to evaluate signals enhanced by a PLC model, training data can be obtained that has been degraded through lossy transmission and then healed using various PLC models. By combining the original audio data and the sampled traces, lossy audio data can be created. The lossy audio data can then be passed through either classical or neural PLC algorithms to create data that can be labeled by human raters to serve as a ground truth and training target.

The following PLC methods were used to generate data to train and evaluate PLCMOS:

1. No-op PLC/"lossy" files (zero fill), oracle PLC
2. Skype Silk and Satin codec PLC
3. Google Lyra codec PLC
4. Neural PLC model variants, employing different architectures (convolutional+recurrent, fully convolutional, end to end recurrent (Thakker et al., "Fast Real-time Personalized Speech Enhancement: End-to-End Enhancement Network (E3Net) and Knowledge Distillation," Proc. Interspeech 2022, pp. 991-995).
5. Neural PLC models trained by participants of the INTERSPEECH 2022 Deep PLC Challenge, (Diener et al., "Interspeech 2022 audio deep packet loss concealment challenge," INTERSPEECH 2022—23rd Annual Conference of the International Speech Communication Association, 2022) described more below in the section entitled "Machine Learning Packet Loss Concealment Models."

These algorithms were employed both with and without the use of additional packet loss concealment techniques such as jitter buffering and forward error correction, to create a dataset that is diverse in the types of degraded audio contained therein.

Labeling

Ground truth scores used for training and evaluating PLCMOS were obtained by using a crowd-sourcing approach based on the ITU P.808 framework (Naderi et al., "An Open Source Implementation of ITU-T Recommendation P.808 with Validation," INTERSPEECH, pp. 2862-2866, October 2020, arXiv: 2005.08138). Audio clips were rated using the Absolute Category Rating (ACR) (International Telecommunications Union, "Subjective evaluation of speech quality with a crowdsourcing approach," ITU-T Recommendation P.808, 2021) approach. Raters were asked to assign discrete ratings ranging from 1 (Bad) to 5 (Excellent) for each degraded file and were not provided with a reference.

Raters were asked to evaluate the overall quality of a file and were asked to consider primarily how well they were able to understand the speaker. Raters were instructed to perform ratings in a quiet environment and to use headphones rather than loudspeakers. They were given some examples of files considered excellent (Score 5) and some files that considered bad (Score 1) to anchor raters expectations.

The following dataset was obtained and employed for the results discussed herein.

TABLE 1

| | | #Models | | #Votes | |
|---|---|---|---|---|---|
| Audio Data | Trace Set | Train | Eval | Train | Eval |
| LibriSpeech | Basic | 78 | 21 | 333740 | 22165 |
| LibriSpeech | Long Bursts | 10 | 2 | 15550 | 990 |
| Podcasts | Heavy Loss | 17 | | 82110 | |
| DNSMOS | | | | 16800 | |

Model Details

Referring back to FIG. 3, the quality estimation model 300 can receive audio spectrogram 308 (e.g., a log power spectrogram) and transform the spectrogram using three convolutional layers. Each convolutional component 310, 312, and 314 can perform 3×3 2D convolutions, with channel counts of 32, 64, and 64 and 2× dilation in the time direction and a 4× reduction of the frequency dimension using max pooling. The resulting sequence can be projected to 512 dimensions using a kernel width 1D convolution, then passed through a bidirectional GRU 318. The audio encoding 320 can include the forward and backward hidden states of the GRU.

The ID embedding module 304 takes an identifier 322 as input, picks a vector from a normal distribution (constant per identifier), and transforms it using a fully connected network (FCC layers 324, 326, and 328, which can have 128, 64, and 128 dimensions, respectively). During inference, 20 random embeddings can be selected from a normal distribution to use as input. Finally, the outputs from the encoder module 302 and ID embedding module 304 are combined using fully connected layers 334, 336, and 338 (each with 32 units) and 340 (with one unit). The output is transformed into the valid range for mean opinion score or "MOS" ratings (one type of quality label) by linearly transforming the output of a sigmoid. Dropout can be used between layers to avoid overfitting.

Training

Quality estimation model 300 was trained for 250 epochs using a batch size of 16 and a learning rate of 0.0003 with an Adam optimizer optimizing the mean squared error between predicted and actual rating. Hyperparameters were optimized using a grid search. Ratings were not aggregated for training—instead, the model was allowed to predict a range of scores by providing the model with an additional normally distributed input. In some instances, rater IDs are not available for all votes in the dataset, so a vote ID is used instead.

Various metrics were evaluated according to how well ratings from PLCMOS correlate with the ground truth MOS ratings. The Pearson correlation coefficient (PCC) and Spearman rank correlation coefficient (SRCC) were determined both single files as well as averaged over all files for a given model. PLCMOS was compared with two other types of metrics. First, with other non-intrusive metrics (Deep Noise Suppression Mean Opinion Score ("DNS-MOS"), Non-Intrusive Speech Quality Assessment ("NISQA")) and PLCMOSv0, a model that uses a non-aligned reference. For NISQA, both overall MOS and Discontinuity score were compared. A version of PLCMOS that does not use an ID input was also considered. The PLCMOS model beats both the more general NISQA model as well as DNSMOS on the PLCMOS task by a large margin. The following table provides the results:

TABLE 2

| | Filewise | | Modelwise | |
|---|---|---|---|---|
| Metric | PCC | SRCC | PCC | SRCC |
| DNSMOS | 0.48 | 0.41 | 0.88 | 0.77 |
| NISQA (MOS) | 0.65 | 0.64 | 0.78 | 0.62 |
| NISQA (discontinuity) | 0.59 | 0.60 | 0.58 | 0.55 |
| PLCMOSv0 (semi-intrusive) | 0.78 | 0.77 | 0.93 | 0.86 |
| PLCMOS (no ID) | 0.77 | 0.76 | 0.95 | 0.95 |
| PLCMOS (proposed) | 0.80 | 0.78 | 0.97 | 0.97 |

Tests were also performed to see how the PLCMOS model functions when training without the ID embedding input and predicting the MOS directly instead of multiple votes ("PLCMOS (no ID)" in Table 2). Correlations are reduced somewhat both when considering files and when considering models.

Table 3 illustrates performance of PLCMOS relative to classical metrics such as Mel-ceptral Distance ("MCD"), Perceptual Evaluation of Speech Quality ("PESQ"), and Short Term Objective Intelligibility ("STOI") as shown in Table 3 below:

TABLE 3

| | Filewise | | Modelwise | |
|---|---|---|---|---|
| Metric | PCC | SRCC | PCC | SRCC |
| MCD | 0.27 | 0.29 | 0.61 | 0.65 |
| PESQ | 0.71 | 0.76 | 0.82 | 0.90 |
| STOI | 0.13 | 0.17 | 0.04 | 0.43 |
| PLCMOS (proposed) | 0.79 | 0.78 | 0.98 | 0.99 |

First Example User Experience

Figure 7:
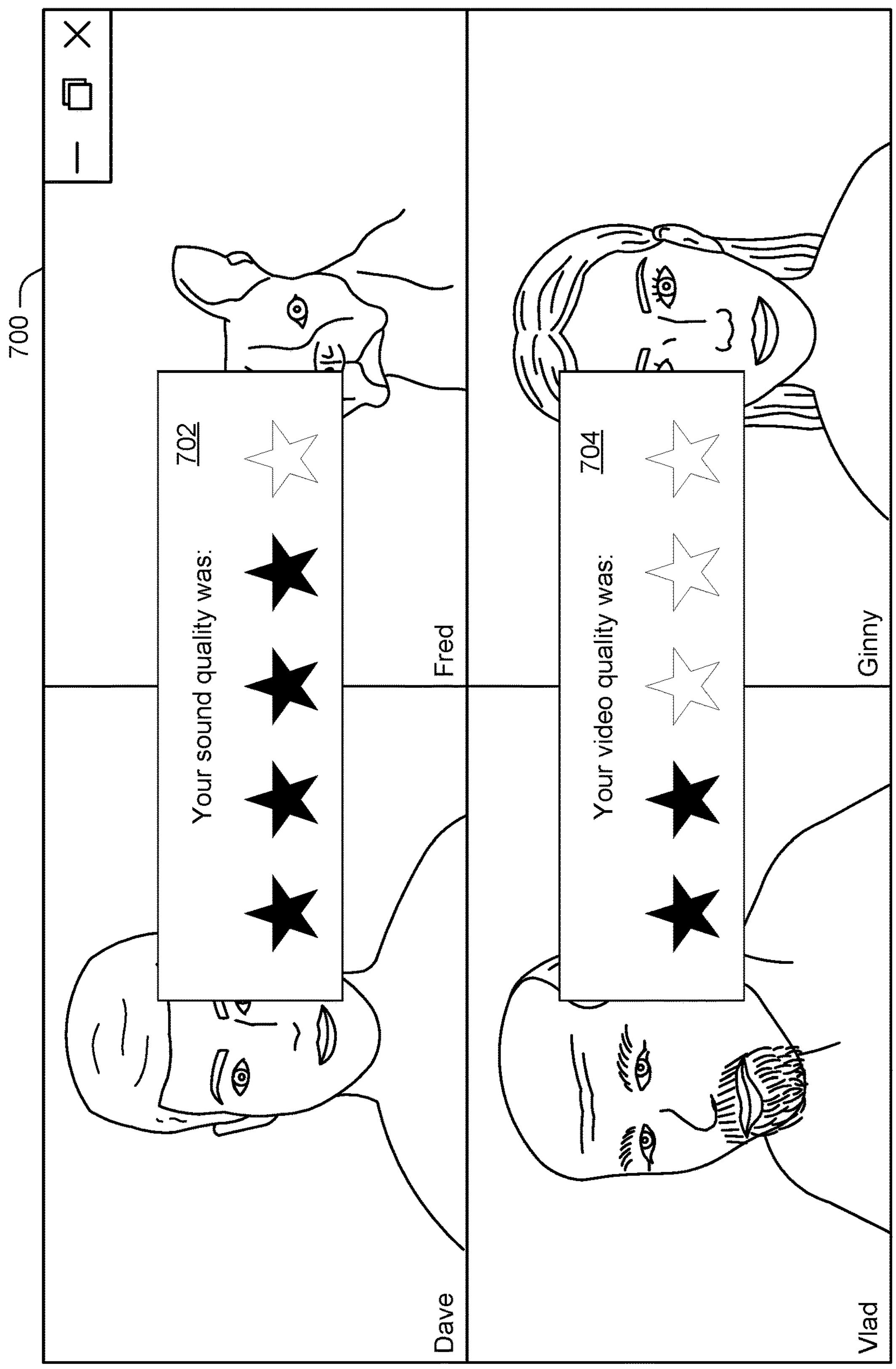
FIGS. 7, 8, and 9 illustrate example user interfaces, consistent with some implementations of the present concepts.

Quality estimation models such as those disclosed herein can also be employed for real-time estimation of signal quality. FIG. 7 illustrates a video call graphical user interface ("GUI") 700 that can be populated with information obtained from a quality estimation model trained as disclosed herein. Video call GUI 700 includes a sound quality estimate 702 that conveys a value of four stars out of five for the audio signal of a video call. Video call GUI 700 also includes a video quality estimate 704 that conveys a value of two stars out of five for the video signal of the video call. In some cases, video call GUI 700 can include an option for the user to confirm or modify the audio or video quality ratings. The user input can be used to manually label audio or video content of the call for subsequent training and/or tuning of a quality estimation model.

Second Example User Experience

Figure 8:
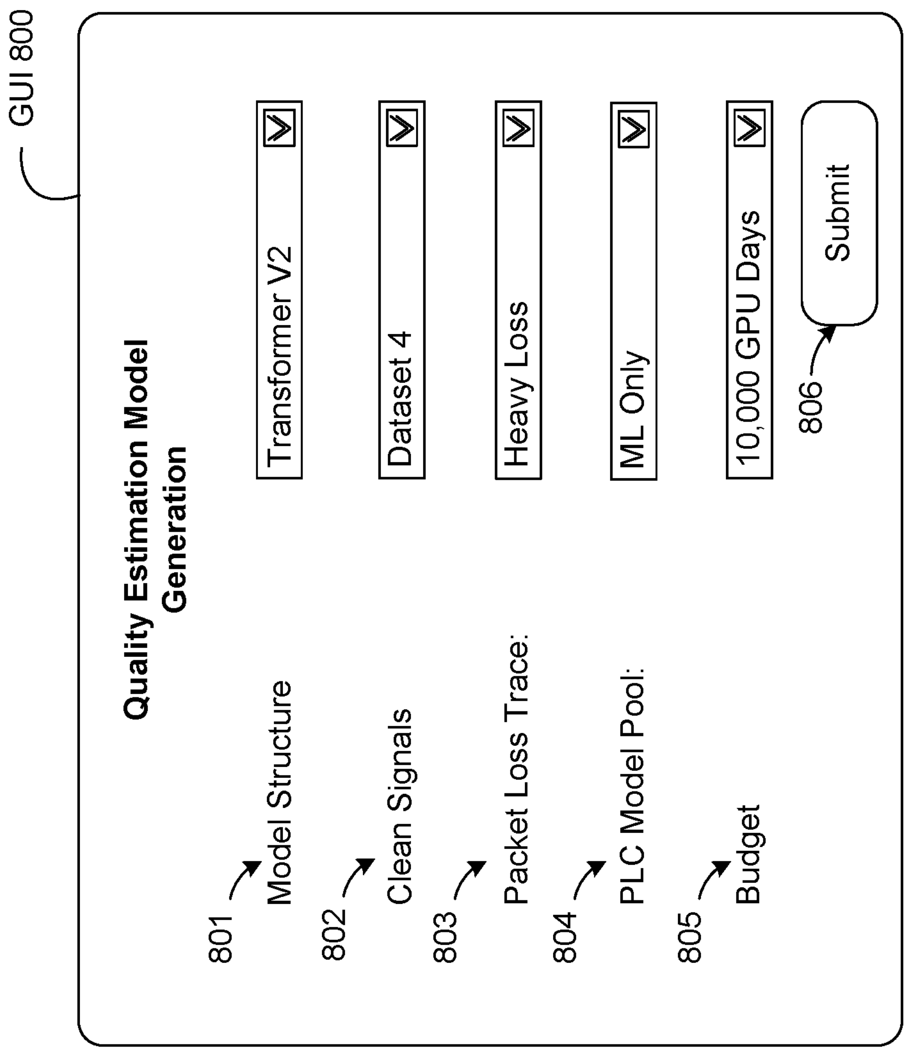

FIG. 8 shows a GUI 800 for configuring training of a quality estimation model for packet loss concealment. Element 801 allows a user to select a specific model structure to train. For example, here the user has selected Transformer V2, which may be a transformer-based model that uses one or more transformers rather than convolutions to encode an audio signal. As another example, the user might select a different type of recurrent layer, e.g., a long short-term memory or "LSTM" layer instead of a GRU.

Element 802 allows a user to select a data set of clean signals to be employed for training. Here, the user has selected Dataset 4, which can include audio signals selected for a particular reason (e.g., a specific human language, gender, emotional speech, etc.). Element 803 allows the user to select a particular packet loss trace. Here, the user has selected heavy loss, e.g., perhaps the user wishes to train a model that works particularly well at estimating audio quality of enhanced speech for an application that tends to experience heavy packet loss.

Element 804 allows the user to select a pool of PLC models to use to train the QOS model. Here, the user has selected a pool of machine learning only models, e.g., omitting any classical algorithms. Element 805 allows the user to select a training budget, e.g., here the user has selected to train the quality estimation model for 10,000 GPU days.

When the user clicks "submit" 806, training module 122 can be configured according to the settings entered by the user. Then, training of a quality estimation model can proceed according to the established settings.

Third Example User Experience

Figure 9:
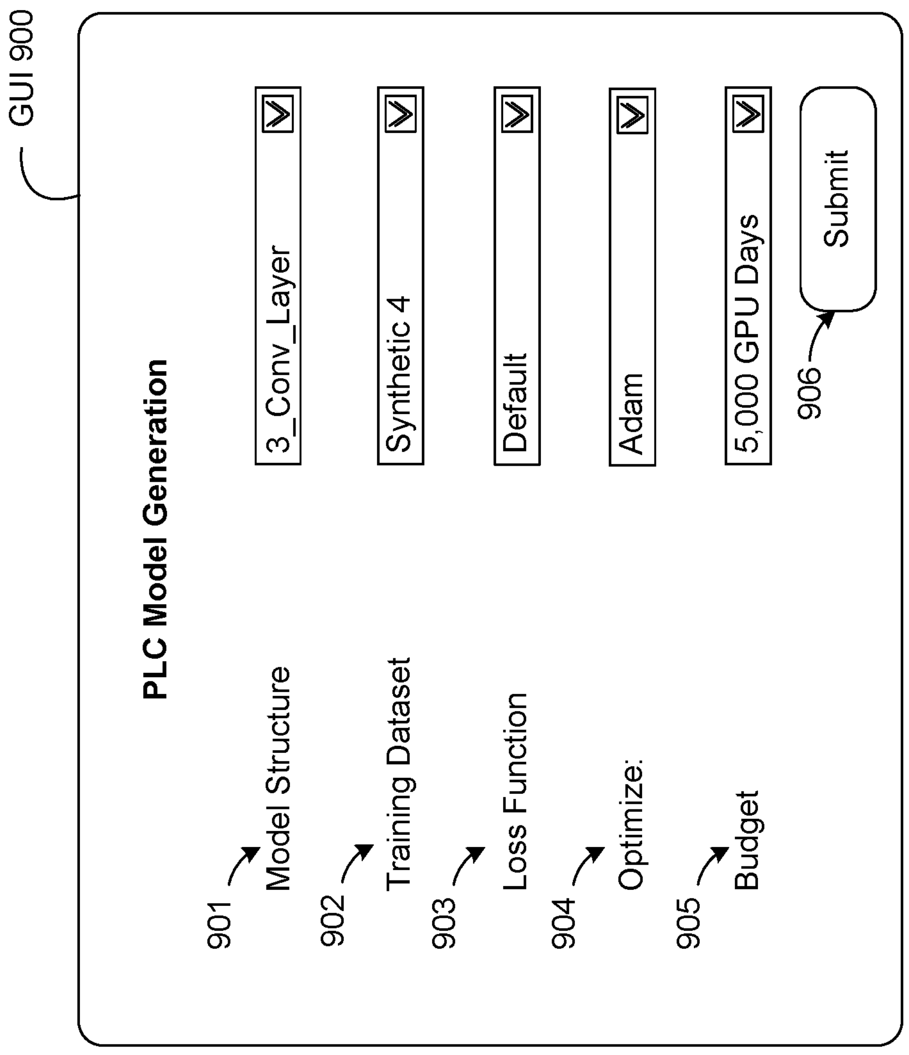

FIG. 9 shows a GUI 900 for configuring generation of a PLC model. Element 901 allows a user to select a model structure to employ. Here, the user has selected a PLC model called "3_conv_layer," e.g., a model with three convolutional layers. Element 902 allows a user to select a training dataset, here the user has selected a training dataset entitled "Synthetic 4," which might include degraded audio signals generated synthetically as described above with respect to FIGS. 5A, 5B, and 5C.

Element 903 allows the user to select a loss function, here the user has selected a default loss function over synthetic labels generated by a quality estimation model. Element 904 allows the user to optimize training, e.g., using the Adam optimizer. Element 905 allows the user to select a training budget, e.g., here the user has selected to train the PLC model for 5,000 GPU days.

When the user clicks "submit" 906, PLC model adaptation module 124 can be configured according to the settings entered by the user. Then, training of a PLC model can proceed according to the established settings.

Classical Packet Loss Concealment Models

The PLC models employed to train a quality estimation model as described herein can include classical models and/or machine learning models. Classical models perform packet loss concealment in the feature space of the codec used to packetize, encode, and decode speech data, preceding the decoding step. In some cases, the codec in question relies on information from consecutive packages in decoding. Iterative improvements have resulted in newer generations of codecs, but are generally based on the Global System for Mobile Telecommunication (Hellwig et al., "Speech codec for the European mobile radio system," 1989 IEEE Global Telecommunications Conference and Exhibition, 'Communications Technology for the 1990s and Beyond', November 1989, pp. 1065-1069, vol. 2) to the modernized Adaptive Multi-Rate Wideband codec used in UMTS (3rd Generation Partnership Project, "Adaptive Multi-Rate (AMR) speech codec; Error concealment of lost frames," Adaptive Multi-Rate (AMR) speech codec, 2004) and the EVS codec used in Voice-over-LTE (Lecomte et al., "Packet-loss concealment technology advances in EVS," 2015 IEEE International Conference on Acoustics, Speech and Signal Processing (ICASSP), April 2015, pp. 5708-5712, iSSN: 2379-190X).

These classical approaches continue decoding as if the change in the coded speech parameters from the last known good frames continues according to some expert-crafted fixed prediction function, e.g., a linear function, with gradual attenuation and replacement of the signal with comfort noise. More modern codecs improve upon this scheme by classifying missing frames into different types (e.g., silence, voiced speech, non-periodic, . . . ) and using different prediction schemes for different frame types.

An additional technique employed in many codecs on top of these methods is forward error correction: When bad network conditions are detected, the sender can transmit redundant information about past frames so that short losses can be better compensated for if the next frame after the loss is already available. The downside of this technique is that it introduces network overhead and additional latency.

Machine Learning Packet Loss Concealment Models

Machine learning approaches can also be employed for packet loss concealment. One neural-network based approach is based on WaveRNN (Kalchbrenner et al., "Efficient Neural Audio Synthesis," arXiv:1802.08435 version 1 (cs, eess), February 2018), which is conditioned on the recent time domain history through a convolutional conditioning network operating in the frequency domain. This network outputs samples autoregressively, one by one, instead of outputting full blocks of audio data at a time.

One issue when training neural networks for audio generation is what loss to use. Generative adversarial networks ("GANs") provide a framework within which a loss does not need to be defined, but can be co-learned by training a discriminator network that tries to classify a sample as either being generated or sampled from the training set, and then training the generation network to try to fool the discriminator. GAN-based approaches have been shown to be able to efficiently generate audio waveforms (Kong et al., "HiFi-GAN: Generative Adversarial Networks for Efficient and High Fidelity Speech Synthesis," arXiv:2010.05646 (cs, eess), October 2020). One PLC approach based on GANs is presented by Shi et al., "Speech Loss Compensation by Generative Adversarial Networks," 2019 Asia-Pacific Signal and Information Processing Association Annual Summit and Conference (APSIPA ASC), November 2019, pp. 347-351, which trains a convolutional encoder/decoder network operating on time domain audio blocks. Pascual et al., "Adversarial Auto-Encoding for Packet Loss Concealment," arXiv:2107.03100 (cs, eess), July 2021, present a GAN-based approach where the generator input is the Mel-spectrogram of the available signal, and the output is the time-domain continuation of this signal. Wang et al., "A temporal-spectral generative adversarial network based end-to-end packet loss concealment for wideband speech transmission," The Journal of the Acoustical Society of America, vol. 150, no. 4, pp. 2577-2588, October 2021, present a GAN-based system with a fully time-domain U-Net style convolutional generator and mixed time/frequency domain discriminator, which allows their adversarial loss to both capture fine short-term details in the waveform as well as long-term relationships in the spectrum. Lin et al., "A Time-Domain Convolutional Recurrent Network for Packet Loss Concealment," ICASSP 2021-2021 IEEE International Conference on Acoustics, Speech and Signal Processing (ICASSP), June 2021, pp. 7148-7152, present a convolutional/recurrent model performing next frame prediction in the time domain, trained to minimize the mean absolute error, with or without look-ahead. Mohamed et al., "ConcealNet: An End-to-end Neural Network for Packet Loss Concealment in Deep Speech Emotion Recognition," arXiv:2005.07777 (cs, eess), May 2020, present a recurrent neural network for packet loss concealment in the context of far-end emotion recognition.

Further Implementations

Quality estimation model 300, shown in FIG. 3, is just one example of a quality estimation model that can be used to evaluate audio signals enhanced by one or more PLC models. For instance, quality estimation models could be employed with a different number or type of convolutional and/or pooling layers, different recurrent structures (e.g., long short-term memory), and to produce different types of outputs (e.g., binary classification). As another example, a transformer architecture could be employed to generate audio encodings instead of a convolutional architecture.

In addition, a vote or rater identification is but one type of contextual information that can be employed to predict a quality label for a given audio signal. For instance, users from different cultural backgrounds, genders, ages, etc., might tend to rate different types of audio signals more positively or negatively. Thus, some implementations employ additional information about raters in embeddings used to predict quality labels. Furthermore, note that contextual information such as rater identification or other profile information can also be employed with other types of enhancement models, such as noise suppressors, echo removers, image/video sharpeners, etc.

In addition, synthetic quality labels produced by a quality estimation model as described herein can be employed for a broad range of applications. As noted, new PLC models can be trained or generated using synthetic labels produced by a quality estimation model. Additionally, existing PLC models can be further tuned or modified as well using synthetic labels produced by a quality estimation model.

As another example, a group of PLC models can be ranked relative to one another using synthetic labels produced by a quality estimation model. For instance, consider two different applications with different packet loss characteristics, e.g., one application that tends to experience packet loss similar to that in the basic trace set and another that tends to experience packet loss similar to that in the heavy loss trace set. PLC models for the first application can be ranked using audio signals degraded using the basic trace set and PLC models for the second application can be ranked using audio signals degraded using the heavy trace set. Thus, an appropriate PLC model can be selected for the actual packet loss conditions each application will tend to experience when deployed.

As another example, a quality estimation model can be employed to automatically adjust the size of a jitter buffer at runtime. Generally, the use of a larger jitter buffer can improve sound quality by reducing the effects of lost packets. However, because sound play is delayed while filling the jitter buffer, conversations can seem relatively less interactive to the users if the jitter buffer is too large. Thus, some implementations can automatically increase the size of a jitter buffer when a quality estimation model detects degraded audio quality, e.g., the average of synthetic labels produced by the model decreases below a threshold for a specified amount of time. Conversely, the jitter buffer size can be automatically decreased when the average of the synthetic quality labels stays above a threshold for a specified amount of time.

In addition, in some cases, PLC models can be updated with code or configuration changes. A quality estimation model can run in the background, detect when a particular code or configuration change causes degraded audio quality, and output an alert indicating that audio quality has been degraded. Thus, the particular code or configuration change can be rolled back to a previous version of the PLC model so that end users do not experience poor audio quality.

Technical Effect

As noted previously, machine learning can be employed for training PLC models to enhance degraded audio signals that have been subjected to packet loss. For instance, a PLC model can be trained using labeled training data to improve the quality of such degraded audio signals. One way to obtain labeled training data for the PLC model is to have human users review processed signals output by the PLC model and evaluate the quality of the enhanced signal, e.g., on a scale of 1-5.

However, manual labeling of training data does not scale well, e.g., it can be time-consuming, laborious, and expensive to obtain large-scale training data. One approach for mitigating this issue could be to use automated technologies, instead of human users, to label enhanced audio signals. For instance, a quality estimation model that could accurately replicate the performance of a human user at labelling enhanced audio signals could drastically reduce the costs associated with training PLC models.

However, as discussed above, existing quality estimation models tend to lack sufficient accuracy to serve as an appropriate substitute for human labelers with regard to audio signals that have been enhanced by PLC models. Ideally, a quality estimation model would be both accurate and robust. Here, accuracy refers to the ability of the quality estimation model to replicate human performance on a given dataset, and robustness refers to the ability of the quality estimation model to retain consistent accuracy when exposed to new audio signals that have different characteristics than those seen during training.

Once a quality evaluation model has been trained in this manner, the quality evaluation model can serve as a substitute for human evaluation. Thus, for example, the quality evaluation model can be used to generate vast amounts of synthetic labels for raw or processed input signals without the involvement of a human user. Synthetic labels can be used to drastically increase the efficiency with which PLC models can be trained to repair missing portions of an audio signal that have been subject to packet loss.

Because a quality estimation model as described herein tends to be more accurate than previous quality estimation models with respect to packet loss concealment scenarios, such a quality estimation model can offer improved performance in such scenarios. For instance, a quality estimation model as described herein can more accurately detect scenarios where a PLC model exhibits degraded performance so that the PLC model can be fixed. Likewise, a quality estimation model as described herein can more accurately rank PLC models relative to one another, and/or adaptively change the size of a jitter buffer at runtime to balance audio quality vs. interactivity of an ongoing conversation.

Device Implementations

As noted above with respect to FIG. 1, system 100 includes several devices, including a client device 110, a server 120, a client device 130, and a client device 140. As also noted, not all device implementations can be illustrated, and other device implementations should be apparent to the skilled artisan from the description above and below.

The term "device", "computer," "computing device," "client device," "server," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as microphones, keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as speakers, printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 150. Without limitation, network(s) 150 can include one or more local area networks (LANs), wide area networks (WANs), the Internet, and the like.

Various examples are described above. Additional examples are described below. One example includes Another example can include any of the above and/or below examples where a method comprising providing degraded audio signals to one or more packet loss concealment models, obtaining enhanced audio signals output by the one or more packet loss concealment models, obtaining quality labels for the enhanced audio signals, and training a quality estimation model to estimate audio signal quality based at least on the enhanced audio signals and the quality labels.

Another example can include any of the above and/or below examples where the quality estimation model comprises a deep neural network.

Another example can include any of the above and/or below examples where the deep neural network has an encoder module configured to map the enhanced audio signals into audio encodings.

Another example can include any of the above and/or below examples where the deep neural network has an output module configured to map the audio encodings into synthetic quality labels that characterize audio signal quality of the enhanced audio signals Another example can include any of the above and/or below examples where the encoder module comprises a convolutional layer and a recurrent layer.

Another example can include any of the above and/or below examples where the recurrent layer comprises a bidirectional gated recurrent unit.

Another example can include any of the above and/or below examples where the deep neural network has one or more embedding layers configured to map identifiers associated with the quality labels into identifier embeddings.

Another example can include any of the above and/or below examples where the identifiers are associated with individual quality labels or raters that provide the individual quality labels.

Another example can include any of the above and/or below examples where the output module is configured to employ the identifier embeddings to determine the synthetic quality labels.

Another example can include any of the above and/or below examples where training the quality estimation model comprises updating parameters of the quality estimation model based at least on two different quality labels provided by at least two different raters for a particular enhanced audio signal.

Another example can include any of the above and/or below examples where the method further comprises generating the degraded audio signals by modifying clean audio signals using packet loss traces from real audio calls.

Another example can include any of the above and/or below examples where the packet loss traces reflect losses and transmission times of packets during the real audio calls.

Another example includes a system comprising a processor and a storage medium storing instructions which, when executed by the processor, cause the processor to obtain enhanced audio signals that have been enhanced by a particular packet loss concealment model, provide the enhanced audio signals to a quality estimation model configured to estimate synthetic quality labels for the enhanced audio signals, the quality estimation model having been trained using other enhanced audio signals output by one or more other packet loss concealment models, and output the synthetic quality labels.

Another example can include any of the above and/or below examples where the instructions, when executed by the processor, cause the system to modify the particular packet loss concealment model based at least on the synthetic quality labels.

Another example can include any of the above and/or below examples where the modifying comprises adjusting at least one of hyperparameters or an architecture of the particular packet loss concealment model.

Another example can include any of the above and/or below examples where the instructions, when executed by the processor, cause the system to rank the particular packet loss concealment model relative to a plurality of other packet loss concealment models using the quality estimation model.

Another example can include any of the above and/or below examples where the instructions, when executed by the processor, cause the system to adjust a size of a jitter buffer of an audio application based at least on the synthetic quality labels.

Another example can include any of the above and/or below examples where the instructions, when executed by the processor, cause the system to output an alert regarding the particular packet loss concealment model in an instance when the synthetic quality labels indicate degraded audio quality of the enhanced audio signals.

Another example includes a computer-readable storage medium storing instructions which, when executed by a computing device, cause the computing device to perform acts comprising providing degraded audio signals to one or more enhancement models, obtaining enhanced audio signals output by the one or more enhancement models, obtaining quality labels for the enhanced audio signals and identifiers associated with the quality labels, and training a quality estimation model to estimate audio signal quality based at least on the enhanced audio signals, the identifiers, and the quality labels.

Another example can include any of the above and/or below examples where the acts further comprise obtaining another enhanced audio signal that has been enhanced by another enhancement model, provide the another enhanced audio signal and multiple other randomly-generated identifiers to the quality estimation model, and determine a synthetic quality label for the another enhanced audio signal by averaging outputs of the quality estimation model for each of the multiple other randomly-generated identifiers.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A computer-implemented method comprising:

providing as input to one or more packet loss concealment models audio signals having missing portions due to network packet loss and receiving from the one or more packet loss concealment models enhanced audio signals comprising restored portions that replace the missing portions of the audio signals using the one or more packet loss concealment models;

obtaining quality labels for the enhanced audio signals output by the one or more packet loss concealment models, wherein the quality labels represent perceived audio quality ratings that characterize how effectively the one or more packet loss concealment models enhanced the degraded audio signals by restoring the missing portions of the audio signals lost due to network packet loss;

using the enhanced audio signals and the quality labels, training a quality estimation model through supervised learning to receive as input an audio signal enhanced by a packet loss concealment model and to generate as output a synthetic quality label indicating a quality of the audio signal as enhanced by the packet loss concealment model, the training comprising updating parameters of the quality estimation model based on differences between synthetic quality labels output by the quality estimation model and the quality labels;

providing new enhanced audio signals, generated by the one or more packet loss concealment models, as input to the trained quality estimation model and generating as output synthetic quality labels for the new enhanced audio signals, each synthetic quality label and its corresponding enhanced audio signal forming a training data pair; and using the training data pairs to improve packet loss concealment performance in an audio application.

2. The method of claim 1, wherein the quality estimation model comprises a deep neural network.

3. The method of claim 2, wherein an encoder module of the deep neural network is configured to map the enhanced audio signals into audio encodings.

4. The method of claim 3, wherein the deep neural network has an output module configured to map the audio encodings into synthetic quality labels that characterize audio signal quality of the enhanced audio signals.

5. The method of claim 4, wherein the encoder module comprises a convolutional layer and a recurrent layer.

6. The method of claim 5, wherein the recurrent layer comprises a bidirectional gated recurrent unit.

7. The method of claim 6, wherein the deep neural network has one or more embedding layers configured to map identifiers associated with the quality labels into identifier embeddings.

8. The method of claim 7, wherein the identifiers are associated with individual quality labels or raters that provide the individual quality labels.

9. The method of claim 7, wherein the output module is configured to employ the identifier embeddings to determine the synthetic quality labels.

10. The method of claim 9, wherein obtaining quality labels for the enhanced audio signals output by the one or more packet loss concealment models comprises obtaining the quality labels from human evaluators; and wherein training the quality estimation model comprises updating parameters of the quality estimation model based at least on two different quality labels provided by at least two different human evaluators for a particular enhanced audio signal.

11. The method of claim 1, further comprising generating the audio signals used as input to the one or more packet loss concealment models as degraded audio signals by modifying clean audio signals using packet loss traces from real audio calls.

12. The method of claim 11, wherein the packet loss traces reflect losses and transmission times of packets during the real audio calls.

13. The method of claim 1, wherein using the training data pairs to improve packet loss concealment performance in an audio application further comprises one or more of:

(i) training a new packet loss concealment model, (ii) modifying parameters or architecture of an existing packet loss concealment model, (iii) ranking a plurality of packet loss concealment models relative to one another, (iv) selecting a packet loss concealment model from a group of available models, (v) adjusting a size of a jitter buffer of an audio application, or (vi) generating an alert regarding degraded audio quality.

14. A system comprising:

a processor; and a storage medium storing instructions which, when executed by the processor, cause the processor to:

providing as input to one or more packet loss concealment models audio signals having missing portions due to network packet loss and receiving from the one or more packet loss concealment models enhanced audio signals comprising restored portions that replace the missing portions of the audio signals using the one or more packet loss concealment models obtaining quality labels for the enhanced audio signals output by the one or more packet loss concealment models, wherein the quality labels represent perceived audio quality ratings that characterize how effectively the one or more packet loss concealment models enhanced the degraded audio signals by restoring the missing portions of the audio signals lost due to network packet loss;

using the enhanced audio signals and the quality labels, training a quality estimation model through supervised learning to receive as input an audio signal enhanced by a packet loss concealment model and to generate as output a synthetic quality label indicating a quality of the audio signal as enhanced by the packet loss concealment model, the training comprising updating parameters of the quality estimation model based on differences between synthetic quality labels output by the quality estimation model and the quality labels;

providing new enhanced audio signals, generated by the one or more packet loss concealment models, as input to the trained quality estimation model and generating as output synthetic quality labels for the new enhanced audio signals, each synthetic quality label and its corresponding enhanced audio signal forming a training data pair; and using the training data pairs to improve packet loss concealment performance in an audio application.

15. The system of claim 14, wherein the instructions, when executed by the processor, cause the system to:

adjust a size of a jitter buffer of an audio application based at least on the synthetic quality labels.

16. The system of claim 14, wherein the instructions, when executed by the processor, cause the system to:

output an alert regarding the particular packet loss concealment model in an instance when the synthetic quality labels indicate degraded audio quality of the enhanced audio signals.

17. The system of claim 14, wherein using the training data pairs to improve packet loss concealment performance in an audio application further comprises one or more of:

(i) training a new packet loss concealment model, (ii) modifying parameters or architecture of an existing packet loss concealment model, (iii) ranking a plurality of packet loss concealment models relative to one another, (iv) selecting a packet loss concealment model from a group of available models, (v) adjusting a size of a jitter buffer of an audio application, or (vi) generating an alert regarding degraded audio quality.

18. A non-transitory computer-readable storage medium storing instructions which, when executed by a computing device, cause the computing device to perform acts comprising:

providing as input to one or more packet loss concealment models audio signals having missing portions due to network packet loss and receiving from the one or more packet loss concealment models enhanced audio signals comprising restored portions that replace the missing portions of the audio signals using the one or more packet loss concealment models;

obtaining quality labels for the enhanced audio signals output by the one or more packet loss concealment models, wherein the quality labels represent perceived audio quality ratings that characterize how effectively the one or more packet loss concealment models enhanced the degraded audio signals by restoring the missing portions of the audio signals lost due to network packet loss;

using the enhanced audio signals and the quality labels, training a quality estimation model through supervised learning to receive as input an audio signal enhanced by a packet loss concealment model and to generate as output a synthetic quality label indicating a quality of the audio signal as enhanced by the packet loss concealment model, the training comprising updating parameters of the quality estimation model based on differences between synthetic quality labels output by the quality estimation model and the quality labels;

providing new enhanced audio signals, generated by the one or more packet loss concealment models, as input to the trained quality estimation model and generating as output synthetic quality labels for the new enhanced audio signals, each synthetic quality label and its corresponding enhanced audio signal forming a training data pair; and using the training data pairs to improve packet loss concealment performance in an audio application.

* * * * *